United States Patent [19]
Sands et al.

[11] Patent Number: 6,134,283
[45] Date of Patent: Oct. 17, 2000

[54] METHOD AND SYSTEM FOR SYNCHRONIZING TIME-DIVISION-DUPLEXED TRANSCEIVERS

[75] Inventors: Nicholas P. Sands, Menlo Park; John A. C. Bingham, Palo Alto, both of Calif.

[73] Assignee: Amati Communications Corporation, San Jose, Calif.

[21] Appl. No.: 08/972,842

[22] Filed: Nov. 18, 1997

[51] Int. Cl.$^7$ .................................................. H04L 7/00
[52] U.S. Cl. ............................................. 375/354; 370/503
[58] Field of Search ......................................... 375/203, 219, 375/354, 357, 362, 364, 365, 368; 370/337, 347, 350, 503, 506, 507, 509, 510, 512, 514; 704/253

[56] References Cited

U.S. PATENT DOCUMENTS

| | | | |
|---|---|---|---|
| 4,935,927 | 6/1990 | Kaewell, Jr. et al. | 370/506 |
| 5,383,225 | 1/1995 | Aguirre et al. | 375/364 |
| 5,627,863 | 5/1997 | Aslanis et al. | 375/357 |
| 5,805,646 | 9/1998 | Wang | 375/354 |
| 5,838,745 | 11/1998 | Wang et al. | 375/364 |
| 6,003,004 | 12/1999 | Hershkovits et al. | 704/253 |

OTHER PUBLICATIONS

American National Standards Institute (ANSI), for Telecommunications Network and Customer Installation Interfaces—Asymmetric Digital Subscriber Line (ADSL) Metallic Interface, ANSI T1.413, 1995, pp. 1–170.

Primary Examiner—Stephen Chin
Assistant Examiner—Chieh M. Fan
Attorney, Agent, or Firm—Beyer Weaver & Thomas, LLP

[57] ABSTRACT

An improved techniques for synchronizing transmissions and receptions of a data transmission system utilizing time division duplexing is disclosed. The improved synchronization techniques utilize the time-varying nature of the energy of the received data to obtain synchronization. In one embodiment, the improved synchronization technique uses the output signals from a multicarrier modulation unit (FFT unit) and thus provides the ability to avoid frequency tones that are susceptible to RF interference. The improved synchronization techniques can also utilize crosstalk interference levels to obtain synchronization. Remote receivers in the data transmission system are able to synchronize to central transmitters, central receivers in the data transmission system are able to synchronize to remote transmitters, and central transmitters are able to synchronize with one another.

24 Claims, 13 Drawing Sheets

METHOD AND SYSTEM FOR SYNCHRONIZING TIME-DIVISION-DUPLEXED TRANSCEIVERS

CROSS-REFERENCE TO RELATED APPLICATION

This application is related to (i) U.S. application Ser. No. 08/707,322 which is entitled "METHOD AND APPARATUS FOR CROSSTALK CANCELLATION" and (ii) U.S. application Ser. No. 08/501,250 which is entitled "TIME DIVISION DUPLEXED HIGH SPEED DATA TRANSMISSION SYSTEM AND METHOD," and both of which are hereby incorporated by reference for all purposes.

BACKGROUND OF THE INVENTION

1. Field of the Invention

The present invention relates to data transmission systems, and more particularly, to data transmission systems utilizing time-division duplexing.

2. Description of the Related Art

Bi-directional digital data transmission systems are presently being developed for high-speed data communications. One standard for high-speed data communications over twisted-pair phone lines that has developed is known as Asymmetric Digital Subscriber Lines (ADSL). Another standard for high-speed data communications over twisted-pair phone lines that is presently proposed is known as Very High Speed Digital Subscriber Lines (VDSL).

The Alliance For Telecommunications Information Solutions (ATIS), which is a group accredited by the ANSI (American National Standard Institute) Standard Group, has finalized a discrete multi tone based approach for the transmission of digital data over twisted-pair phone lines. The standard, known as ADSL, is intended primarily for transmitting video data and fast Internet access over ordinary telephone lines, although it may be used in a variety of other applications as well. The North American Standard is referred to as the ANSI T1.413 ADSL Standard (hereinafter ADSL standard), and is hereby incorporated by reference. Transmission rates under the ADSL standard are intended to facilitate the transmission of information at rates of up to 8 million bits per second (Mbits/s) over twisted-pair phone lines. The standardized system defines the use of a discrete multi tone (DMT) system that uses 256 "tones" or "sub-channels" that are each 4.3125 kHz wide in the forward (downstream) direction. In the context of a phone system, the downstream direction is defined as transmissions from the central office (typically owned by the telephone company) to a remote location that may be an end-user (i.e., a residence or business user). In other systems, the number of tones used may be widely varied.

The ADSL standard also defines the use of reverse transmissions at a data rate in the range of 16 to 800 Kbit/s. The reverse transmissions follow an upstream direction, as for example, from the remote location to the central office. Thus, the term ADSL comes from the fact that the data transmission rate is substantially higher in the downstream direction than in the upstream direction. This is particularly useful in systems that are intended to transmit video programming or video conferencing information to a remote location over telephone lines.

Because both downstream and upstream signals travel on the same pair of wires (that is, they are duplexed) they must be separated from each other in some way. The method of duplexing used in the ADSL standard is Frequency Division Duplexing (FDD) or echo canceling. In frequency division duplexed systems, the upstream and downstream signals occupy different frequency bands and are separated at the transmitters and receivers by filters. In echo cancel systems, the upstream and downstream signals occupy the same frequency bands and are separated by signal processing.

ANSI is producing another standard for subscriber line based transmission system, which is referred to as the VDSL standard. The VDSL standard is intended to facilitate transmission rates of at least about 6 Mbit/s and up to about 52 Mbit/s or greater in the downstream direction. Simultaneously, the Digital, Audio and Video Council (DAVIC) is working on a similar system, which is referred to as Fiber To The Curb (FTTC). The transmission medium from the "curb" to the customer is standard unshielded twisted-pair (UTP) telephone lines.

A number of modulation schemes have been proposed for use in the VDSL and FTTC standards (hereinafter VDSL/FTTC). For example, some of the possible VDSL/FTTC modulation schemes include multi-carrier transmission schemes such as Discrete Multi-Tone modulation (DMT) or Discrete Wavelet Multi-Tone modulation (DWMT), as well as single carrier transmission schemes such as Quadrature Amplitude Modulation (QAM), Carrierless Amplitude and Phase modulation (CAP), Quadrature Phase Shift Keying (QPSK), or vestigial sideband modulation.

Additionally, multicarrier modulation transmission schemes have been receiving a large amount of attention due to the high data transmission rates they offer. FIG. 1A is a simplified block diagram of a conventional transmitter 100 for a multicarrier modulation system. The conventional transmitter 100 is, for example, suitable for DMT modulation in ADSL or VDSL systems. The transmitter 100 receives data signals to be transmitted at a buffer 102. The data signals are then supplied from the buffer 102 to a forward error correction (FEC) unit 104. The FEC unit 104 compensates for errors that are due to crosstalk noise, impulse noise, channel distortion, etc. The signals output by the FEC unit 104 are supplied to a data symbol encoder 106. The data symbol encoder 106 operates to encode the signals for a plurality of frequency tones associated with the multicarrier modulation. In assigning the data, or bits of the data, to each of the frequency tones, the data symbol encoder 106 utilizes data stored in a transmit bit allocation table 108 and a transmit energy allocation table 110. The transmit bit allocation table 108 includes an integer value for each of the carriers (frequency tones) of the multicarrier modulation. The integer value indicates the number of bits that are to be allocated to the particular frequency tone. The value stored in the transmit energy allocation table 110 is used to effectively provide fractional number of bits of resolution via different allocation of energy levels to the frequency tones of the multicarrier modulation. In any case, after the data symbol encoder 106 has encoded the data onto each of the frequency tones, an Inverse Fast Fourier Transform (IFFT) unit 112 modulates the frequency domain data supplied by the data symbol encoder 106 and produces time domain signals to be transmitted. The time domain signals are then supplied to a digital-to-analog converter (DAC) 114 where the digital signals are converted to analog signals. Thereafter, the analog signals are transmitted over a channel to one or more remote receivers.

FIG. 1B is a simplified block diagram of a conventional remote receiver 150 for a multicarrier modulation system. The conventional remote receiver 150 is, for example, suitable for DMT demodulation in ADSL or VDSL systems. The remote receiver 150 receives analog signals that have been transmitted over a channel by a transmitter. The received analog signals are supplied to an analog-to-digital converter (ADC) 152. The ADC 152 converts the received analog signals to digital signals. The digital signals are then supplied to a Fast Fourier Transform (FFT) unit 154 that demodulates the digital signals while converting the digital signals from a time domain to a frequency domain. The demodulated digital signals are then supplied to a frequency domain equalizer (FEQ) unit 156. The FEQ unit 156 performs an equalization on the digital signals so the attenuation and phase are equalized over the various frequency tones. Then, a data symbol decoder 158 receives the equalized digital signals. The data symbol decoder 158 operates to decode the equalized digital signals to recover the data, or bits of data, transmitted on each of the carriers (frequency tones). In decoding the equalized digital signals, the data symbol decoder 158 needs access to the bit allocation information and the energy allocation information that were used to transmit the data. Hence, the data symbol decoder 158 is coupled to a received bit allocation table 162 and a received energy allocation table 160 which respectively store the bit allocation information and the energy allocation information that were used to transmit the data. The data obtained from each of the frequency tones is then forwarded to the forward error correction (FEC) unit 164. The FEC unit 164 performs error correction of the data to produce corrected data. The corrected data is then stored in a buffer 166. Thereafter, the data may be retrieved from the buffer 166 and further processed by the receiver 150. Alternatively, the received energy allocation table 160 could be supplied to and utilized by the FEQ unit 166.

The bit allocation tables and the energy allocation tables utilized in the conventional transmitter 100 can be implemented as a single table or as individual tables. Likewise, the bit allocation tables and the energy allocation tables utilized in the remote receiver 150 can be implemented as a single table or as individual tables. Also, the transmitter 100 is normally controlled by a controller, and the remote receiver 150 is normally controlled by a controller. Typically, the controllers are programmable controllers.

The transmitter 100 and the remote receiver 150 illustrated in FIGS. 1A and 1B, respectively, optionally include other components. For example, the transmitter 100 could add a cyclic prefix to symbols after the IFFT unit 112, and the remote receiver 150 can then remove the cyclic prefix before the FFT unit 154. Also, the remote receiver 150 can provide a time domain equalizer (TEQ) unit between the ADC 152 and the FFT unit 154.

Most of the proposed VDSL/FTTC transmission schemes utilize frequency division duplexing (FDD) of the upstream and downstream signals. On the other hand, one particular proposed VDSL/FTTC transmission scheme uses time division duplexing (TDD) of the upstream and downstream signals. More particularly, the time division duplexing is synchronized in this case such that periodic synchronized upstream and downstream communication periods do not overlap with one another. That is, the upstream and downstream communication periods for all of the wires that share a binder are synchronized. With this arrangement, all the very high speed transmissions within the same binder are synchronized and time division duplexed such that downstream communications are not transmitted at times that overlap with the transmission of upstream communications. This is also referred to as a (i.e. "ping pong") based data transmission scheme. Quiet periods, during which no data is transmitted in either direction, separate the upstream and downstream communication periods. When the synchronized time division duplexed approach is used with DMT it is often referred to as synchronized DMT (SDMT).

A common feature of the above-mentioned transmission systems is that twisted-pair phone lines are used as at least a part of the transmission medium that connects a central office (e.g., telephone company) to users (e.g., residence or business). Even though fiber optics may be available from a central office to the curb near a user's residence, twisted-pair phone lines are used to bring in the signals from the curb into the user's home or business.

The twisted-pair phone lines are grouped in a binder. While the twisted-pair phone lines are within the binder, the binder provides reasonably good protection against external electromagnetic interference. However, within the binder, the twisted-pair phone lines induce electromagnetic interference on each other. This type of electromagnetic interference is generally known as crosstalk interference which includes near-end crosstalk (NEXT) interference and far-end crosstalk (FEXT) interference. As the frequency of transmission increases, the crosstalk interference (NEXT interference) becomes substantial. As a result, the data signals being transmitted over the twisted-pair phone lines at high speeds can be significantly degraded by the crosstalk interference caused by other twisted-pair phone lines in the binder. As the speed of the data transmission increases, the problem worsens. The advantage of the synchronized TDD (such as SDMT) based data transmission is that crosstalk interference (NEXT interference) from other lines in a binder is essentially eliminated, provided all the lines transmit for the same duration (i.e., same superframe format).

A data transmission system normally includes a central office and a plurality of remote units. Each remote unit communicates with the central office over a data link (i.e., channel) that is established between the central office and the particular remote unit. To establish such a data link, initialization processing is performed to initialize communications between the central office and each of the remote units. For purposes of the discussion to follow, a central office includes a central modem (or central unit) and a remote unit includes a remote modem. These modems are transceivers that facilitate data transmission between the central office and the remote unit. The central office thus normally includes a plurality of central side transceivers, each of which has a central side transmitter and a central side receiver, and the remote unit normally includes a remote side transceiver having a remote side transmitter and a remote side receiver.

One conventional frame synchronization technique required the transmission of a predetermined sequence of data which was received by a receiver and then correlated with a predetermined stored sequence of data to determine the adjustment required in order to yield synchronization. U.S. Pat. No. 5,627,863 describes a frame synchronization approach suitable for systems (e.g., ADSL) using frequency division duplexing (FDD) or echo cancelling to provide duplexed operation. This frame synchronization technique requires a special start-up training sequence to obtain the frame synchronization. However, the described frame synchronization approach is not suitable for systems (e.g., synchronized TDD or SDMT) using time division duplexing because synchronization in time is not necessary for FDD or echo cancelling as it is with TDD in order to reduce crosstalk.

When a data transmission system is operating in a time-division duplexed (TDD) manner, the transmitters and receivers of the central office and remote units must be synchronized in time so that transmission and reception do not overlap in time. In a data transmission system, downstream transmissions are from a central side transmitter to one or more remote side receivers and upstream transmissions are from one or more remote side transmitters to a central side receiver. The central side transmitter and receiver can be combined as a central side transceiver, and the remote side transmitter and receiver can be combined as a remote side transceiver.

Generally speaking, in a time division duplexed system, upstream signals are alternated with downstream signals. Typically, the upstream transmissions and the downstream transmissions are separated by a guard interval or a quiet period. The guard interval is provided to enable the transmission system to reverse the direction in which data is being transmitted so that a transmission can be received before the transmission in the opposite direction occurs. Some transmission schemes divide upstream and downstream transmissions into smaller units referred to as frames. These frames may also be grouped into superframes that include a series of downstream frames and a series of upstream frames, as well as guard intervals between the two.

Time-division duplexing is a simple method to share a channel (medium) between two or more transceivers. Each transceiver is assigned a time slot during which it may transmit, and there are quiet periods (guard intervals) during which no unit must transmit. On channels subject to crosstalk (NEXT interference) between multiple connections, if time-division duplexing is used, synchronization must be established and maintained among all units so affected. An example is the VDSL service that uses the existing twisted pair telephone loop plant to transport up to 13–52 Mb/s on loops up to 1.5 km. Pairs destined for subscribers are bundled together in a cable consisting of 25–100 pairs. The proximity and the high frequency use (0.2–11 MHz signal bandwidth) leads to significant crosstalk between adjacent pairs in a binder. To get the desired data rate on loops up to 1.5 km long, DMT is a suitable multicarrier modulation scheme. This scheme makes excellent use of time-division duplexing since a single FFT unit can be used during transmission and reception and avoids the need for two such FFT units, and other savings in the analog circuitry.

Conventional frame synchronization techniques are not only not well suited for synchronized TDD but also are unreliable when RF interference is present. Due to the potential for significant RF interference due to amateur radio frequency bands, the RF interference might have a signal power equal to, or perhaps greater than, the desired receive signal power under some conditions. However, in a synchronized TDD system, it is important that synchronization be established and maintained so that crosstalk is mitigated and controlled and/or received data is accurately recovered.

Accordingly, there is a need for improved synchronization techniques for timedivision duplexed systems.

SUMMARY OF THE INVENTION

Broadly speaking, the invention relates to improved techniques for synchronizing transmissions and receptions of a data transmission system utilizing time division duplexing. According to one aspect of the invention, the improved synchronization techniques utilize the time-varying nature of the energy of the received data to obtain synchronization. In one embodiment, the improved synchronization technique uses the output signals from a multicarrier modulation unit (e.g., FFT unit) and thus provides the ability to avoid frequency tones that are susceptible to RF interference.

According to another aspect of the invention, the improved synchronization techniques utilize crosstalk interference levels to obtain synchronization. With the improved synchronization techniques, remote receivers in the data transmission system are able to synchronize to central transmitters, central receivers in the data transmission system are able to synchronize to remote transmitters, and central transmitters are able to synchronize with one another.

The invention can be implemented in numerous ways, including as an apparatus, system, method, or computer readable media. Several embodiments of the invention are discussed below.

As a method for adjusting an alignment for a first transceiver to receive frames of data transmitted from a second transceiver over a transmission medium to the first transceiver, where the first transceiver and the second transceiver are associated with a data transmission system providing two-way data communication using time division duplexing, an embodiment of the invention includes the operations of: measuring an energy amount for each of a plurality of consecutive frames of received data; detecting an edge in the plurality of consecutive frames of the received data based on the measured energy amounts; and computing an alignment error estimate using the edge detected in the plurality of consecutive frames. Additionally, the synchronization may thereafter be adjusted in accordance with the alignment error estimate. Optionally, the data transmission system transmits data using a superframe structure having a plurality of frames, a first set of the frames in the superframe transmit data in a first direction, and a second set of the frames in the superframe transmit data in a second direction.

As a computer readable medium containing program instructions for adjusting an alignment for a first transceiver to receive frames of data transmitted from a second transceiver over a transmission medium to the first transceiver, the first transceiver and the second transceiver being associated with a data transmission system providing two-way data communication using time division duplexing, an embodiment of the invention includes: first computer readable code devices for measuring an energy amount for each of a plurality of consecutive frames of received data; second computer readable code devices for detecting an edge in the plurality of consecutive frames of the received data based on the measured energy amounts; and third computer readable code devices for computing an alignment error estimate using the edge detected in the plurality of consecutive frames.

As a receiver for a data transmission system using time division duplexing to alternate between transmission and reception of data, an embodiment of the invention includes: an analog-to-digital converter, the analog-to-digital converter receives analog data that has been transmitted over a channel to the receiver and converts the received analog signals into received digital signals; an input buffer for temporarily storing the received digital signals; a multicarrier demodulation unit, the multicarrier demodulation unit demodulates the received digital signals from the input buffer to frequency domain data for a plurality of different carrier frequencies; a frame synchronization unit, the frame synchronization unit synchronizes a receive frame boundary for the multicarrier demodulation unit based on the time-varying nature of the of the energy of the frequency domain data produced by the multicarrier demodulation unit; a bit allocation table, the allocation table stores bit allocation information used in transmitting data being received at the receiver; a data symbol decoder, the data symbol decoder receives the frequency domain data and decodes bits associated with the frequency domain data from the carrier frequencies based on the bit allocation information stored in the bit allocation table; and an output buffer for storing the decoded bits as recovered data. Preferably, the data transmission system is a synchronized DMT system, and wherein the multicarrier demodulation unit includes a FFT unit.

As a receiver for a data transmission system using time division duplexing to alternate between transmission and reception of data, another embodiment of the invention includes: an analog-to-digital converter, the analog-to-digital converter receives analog data that has been transmitted over a channel to the receiver and converts the received analog signals into received digital signals; an input buffer for temporarily storing the received digital signals; a multicarrier demodulation unit, the multicarrier demodulation unit demodulates the received digital signals from the input buffer to frequency domain data for a plurality of different carrier frequencies; frame synchronization means for synchronizing a receive frame boundary for the multicarrier demodulation unit based on the time-varying nature of the of the energy of the frequency domain data produced by the multicarrier demodulation unit; a bit allocation table, the allocation table stores bit allocation information used in transmitting data being received at the receiver; a data symbol decoder, the data symbol decoder receives the frequency domain data and decodes bits associated with the frequency domain data from the carrier frequencies based on the bit allocation information stored in the bit allocation table; and an output buffer for storing the decoded bits as recovered data.

For a data transmission system having a plurality of transmitters at a central site where an external clock signal is unavailable for synchronizing the transmitters, the transmitters transmit data in accordance with a superframe format including at least one quiet period, a method for synchronizing data transmissions by a given transmitter to other of the transmitters at the central site according to an embodiment of the invention includes the acts of: measuring the energy in the quiet period associated with the given transmitter due to data transmissions from the other of the transmitters at the central site; comparing the measured energy with a threshold amount; and modifying the synchronization for the transmissions by the given transmitter when the comparing indicates that the measured energy exceeds the threshold amount.

As a computer readable medium containing program instructions for synchronizing data transmissions in a data transmission system having a plurality of transmitters at a central site where an external clock signal is unavailable for synchronizing the transmitters, the transmitters transmit data in accordance with a superframe format including at least one quiet period, an embodiment of the invention includes: first computer readable code devices for measuring the energy in the quiet period associated with a given transmitter due to data transmissions from other of the transmitters at the central site; second computer readable code devices for comparing the measured energy with a threshold amount; and third computer readable code devices for modifying the synchronization for the transmissions by the given transmitter when the comparing indicates that the measured energy exceeds the threshold amount.

The advantages of the invention are numerous. One advantage of the invention is that synchronization can be achieved even in the presence of radio frequency (RF) interference, such as due to amateur radio users. Another advantage of the invention is that it is well suited for data transmission systems utilizing time division duplexing such as synchronized DMT or synchronized VDSL. Yet another advantage of the invention is that it is relatively insensitive to noise in the data transmission system.

Other aspects and advantages of the invention will become apparent from the following detailed description, taken in conjunction with the accompanying drawings, illustrating by way of example the principles of the invention.

BRIEF DESCRIPTION OF THE DRAWINGS

The present invention will be readily understood by the following detailed description in conjunction with the accompanying drawings, wherein like reference numerals designate like structural elements, and in which.

DETAILED DESCRIPTION OF THE INVENTION

The invention relates to improved techniques for synchronizing transmissions and receptions by a data transmission system utilizing time division duplexing. In one aspect of the invention, the improved synchronization techniques utilize the time-varying nature of the energy of the received data to obtain synchronization. In another aspect of the invention, the improved synchronization techniques utilize crosstalk interference levels to obtain synchronization. With the improved synchronization techniques, remote receivers in the data transmission system are able to synchronize to central transmitters, central receivers in the data transmission system are able to synchronize to remote transmitters, and central transmitters are able to synchronize with one another.

The synchronization required in a time-division duplex system requires that transmissions be synchronized with a superframe structure. Conventional time-domain methods which tend to correlate samples, such as first and last samples in a frame to detect a cyclic prefix, are not reliable because of the likely presence of RF interference in the receive signals which can be of equal power to be desired signals. However, the invention provides accurate techniques to synchronize transmissions in a time-division duplex system even when RF interference renders the time domain signal unreliable. The frequency domain approach to synchronization provided by the invention is able to obtain significant immunity from RF interference. In one embodiment, the improved synchronization technique preferably uses the output signals from a multicarrier modulation unit (FFT unit) and thus provides the ability to avoid frequency tones that are susceptible to radio frequency (RF) interference.

Embodiments of the invention are discussed below with reference to FIGS. 1A–12. However, those skilled in the art will readily appreciate that the detailed description given herein with respect to these figures is for explanatory purposes as the invention extends beyond these limited embodiments.

Figure 2:
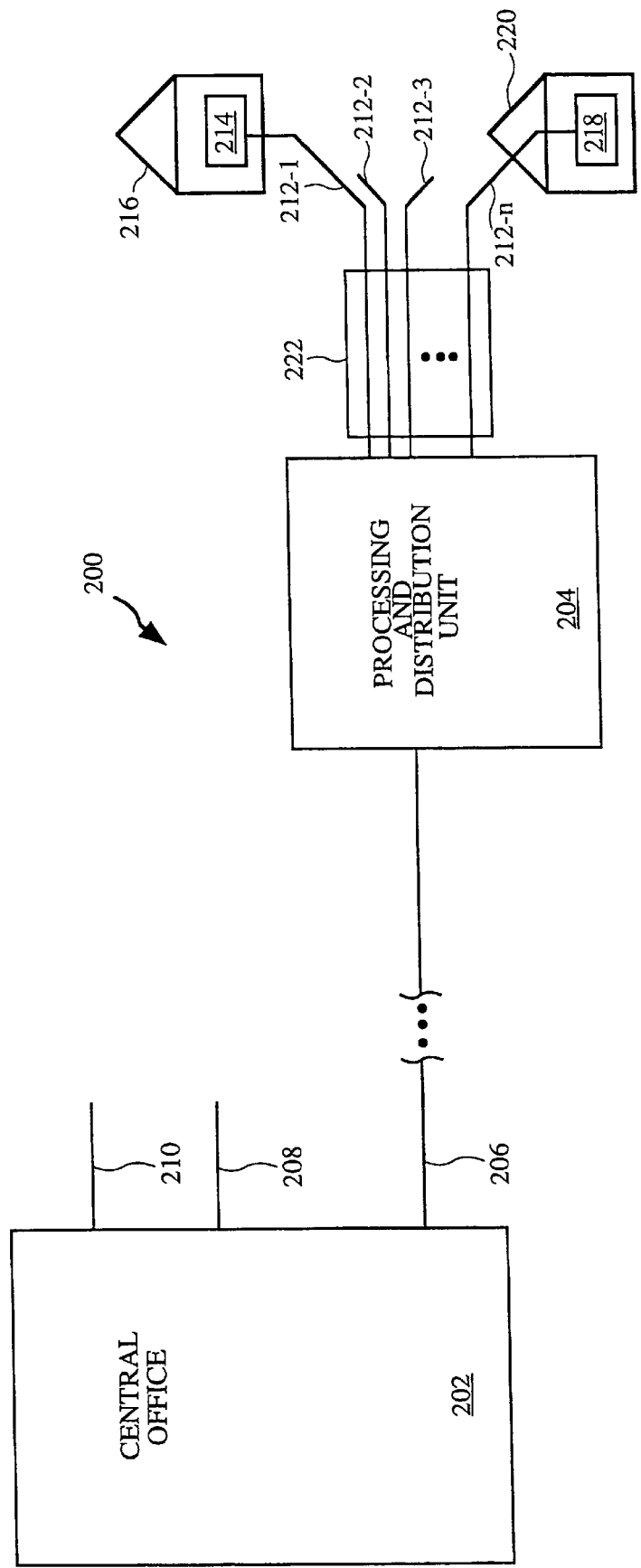
FIG. 2 is a block diagram of an exemplary telecommunications network suitable for implementing the invention.

FIG. 2 is a block diagram of an exemplary telecommunications network 200 suitable for implementing the invention. The telecommunications network 200 includes a central office 202. The central office 202 services a plurality of distribution posts to provide data transmission to and from the central office 202 to various remote units. In this exemplary embodiment, each of the distribution posts is a processing and distribution unit 204 (node). The processing and distribution unit 204 is coupled to the central office 202 by a high speed, multiplexed transmission line 206 that may take the form of a fiber optic line. Typically, when the transmission line 206 is a fiber optic line, the processing and distribution unit 204 is referred to as an optical network unit (ONU). The central office 202 also usually interacts with and couples to other processing and distribution units (not shown) through high speed, multiplexed transmission lines 208 and 210, but only the operation of the processing and distribution unit 204 is discussed below. In one embodiment, the processing and distribution unit 204 includes one or more modems (central modems).

The processing and distribution unit 204 services a multiplicity of discrete subscriber lines 212-1 through 212-n. Each subscriber line 212 typically services a single end user. The end user has a remote unit suitable for communicating with the processing and distribution unit 204 at very high data rates. More particularly, a remote unit 214 of a first end user 216 is coupled to the processing and distribution unit 204 by the subscriber line 212-1, and a remote unit 218 of a second end user 220 is coupled to the processing and distribution unit 204 by the subscriber line 212-n. The remote units 214 and 218 include a data communications system capable of transmitting data to and receiving data from the processing and distribution unit 204. In one embodiment, the data communication systems are modems. The remote units 214 and 218 can be incorporated within a variety of different devices, including for example, a telephone, a television, a monitor, a computer, a conferencing unit, etc. Although FIG. 2 illustrates only a single remote unit coupled to a respective subscriber line, it should be recognized that a plurality of remote units can be coupled to a single subscriber line. Moreover, although FIG. 2 illustrates the processing and distribution unit 204 as being centralized processing, it should be recognized that the processing need not be centralized and could be performed independently for each of the subscriber lines 212.

The subscriber lines 212 serviced by the processing and distribution unit 204 are bundled in a shielded binder 222 as the subscriber lines 212 leave the processing and distribution unit 204. The shielding provided by the shielded binder 222 generally serves as a good insulator against the emission (egress) and reception (ingress) of electromagnetic interference. However, the last segment of these subscriber lines, commonly referred to as a "drop" branches off from the shielded binder 222 and is coupled directly or indirectly to the end user's remote units. The "drop" portion of the subscriber line between the respective remote unit and the shielded binder 222 is normally an unshielded, twisted-pair wire. In most applications the length of the drop is not more than about 30 meters.

Crosstalk interference, including near-end crosstalk (NEXT) and far-end crosstalk (FEXT), primarily occurs in the shielded binder 222 where the subscriber lines 212 are tightly bundled. Hence, when data is transmitted on some of the subscriber lines 212 while other subscriber lines are receiving data as is common when multiple levels of service are being provided, the crosstalk inference induced becomes a substantial impairment to proper reception of data. Hence, to overcome this problem, data is transmitted using a superframe structure over which bits of data to be transmitted are allocated. The telecommunications network 200, for example, is particularly well suited for a synchronized TDD transmission system (e.g., synchronized VDSL or SDMT) offering different levels of service.

Hence, referring to the SDMT transmission system shown in FIG. 2, data transmissions over all lines 212 in the shielded binder 222 associated with the processing and distribution unit 204 need to be synchronized. As such, all active lines emanating from the processing and distribution unit 204 could be transmitting in the same direction (i.e., downstream or upstream) so as to substantially eliminate NEXT interference.

Figure 3:
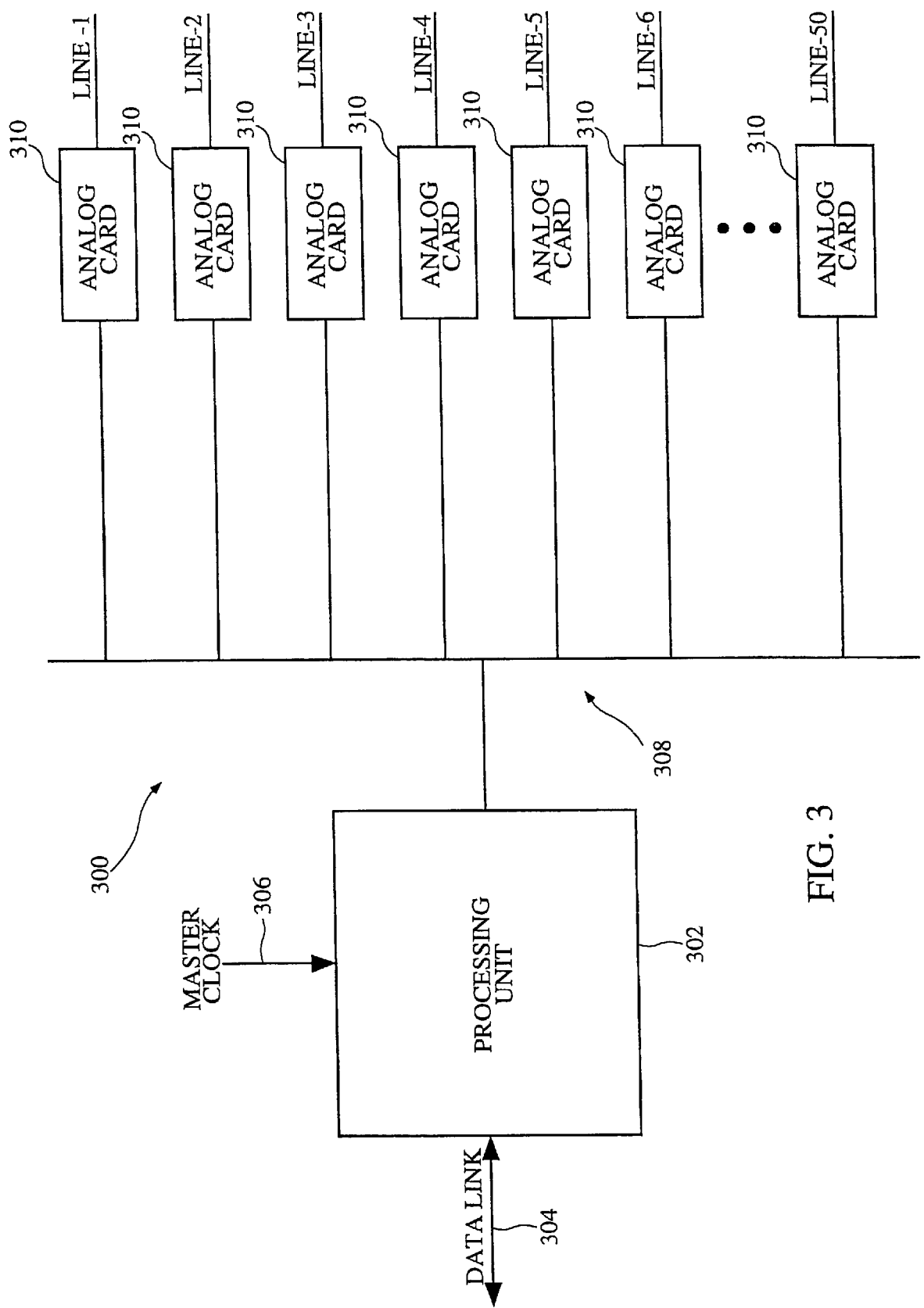
FIG. 3 is a block diagram of a processing and distribution unit 300 according to an embodiment of the invention.

FIG. 3 is a block diagram of a processing and distribution unit 300 according to an embodiment of the invention. For example, the data processing and distribution unit 300 is a detailed implementation of the processing and distribution unit 204 illustrated in FIG. 2.

The data processing and distribution unit 300 includes a processing unit 302 that receives data and sends data over a data link 304. The data link 304 could, for example, be coupled to a fiber optic cable of a telephone network or a cable network. The processing unit 302 needs to operate to synchronize the various processed transmissions and receptions of the processing unit 302. The data processing and distribution unit 300 further includes a bus arrangement 308 and a plurality of analog cards 310. The output of the processing unit 302 is coupled to the bus arrangement 308. The bus arrangement 308 together with the processing unit 302 thus direct output data from the processing unit 302 to the appropriate analog cards 310 as well as direct input from the analog cards 310 to the processing unit 302. The analog cards 310 provide analog circuitry utilized by the processing and distribution unit 300 that is typically more efficiently performed with analog components than using digital processing by the processing unit 302. For example, the analog circuitry can include filters, transformers, analog-to-digital converters or digital-to-analog converters. Each of the analog cards 310 are coupled to a different line. Typically, all the lines for a given data transmission system 300 are bundled into a binder including about fifty (50) lines (LINE-1 through LINE-50). Hence, in such an embodiment, there are fifty (50) analog cards 310 respectively coupled to the fifty (50) lines. In one embodiment, the lines are twisted-pair wires. The processing unit 302 may be a general-purpose computing device such as a digital signal processor (DSP) or a dedicated special purpose device. The bus arrangement 308 may take many arrangements and forms. The analog cards 310 need not be designed for individual lines, but could instead be a single card or circuitry that supports multiple lines.

In a case where the processing is not centralized, the processing unit 302 in FIG. 3 can be replaced by modems for each of the lines. The processing for each of the lines can then be performed independently for each of the lines. In this case, the modem may be placed on a single card along with the analog circuitry.

The NEXT interference problem occurs on the lines proximate to the output of the processing and distribution unit 300. With respect to the block diagram illustrated in FIG. 3, the NEXT interference is most prevalent near the outputs of the analog cards 310 because this is where the lines are closest to one another and have their largest power differential (between transmitted and received signals). In other words, from the output of the processing and distribution unit 300 the lines travel towards the remote units. Usually, most of the distance is within a shielded binder that would, for example, hold fifty (50) twisted-pair wires, and the remaining distance is over single unshielded twisted-pair wires. Because all these lines (e.g., twisted-pair wires) are held in close proximity in the binder and individually offer little shielding against electromagnetic coupling from other of the lines in the binder, crosstalk interference (namely NEXT interference and FEXT interference) between the lines within the binder is problematic.

Depending on the level of service being provided, data transmission implemented with SDMT can be symmetric or asymmetric with respect to upstream and downstream transmissions. With symmetric transmission, DMT symbols tend to be transmitted in alternating directions for equal durations. In other words, the duration in which DMT symbols are transmitted downstream is the same as the duration in which DMT symbols are transmitted upstream. With asymmetric transmission, DMT symbols tend to be transmitted downstream for a longer duration than upstream.

In VDSL it has been proposed to have a superframe structure including a fixed number (e.g., 20) frames, with each frame being associated with a DMT symbol. With such a frame format, the number of frames being used for downstream transmissions and the number of frames being used for upstream transmissions can vary. As a result, there are several different superframe formats that can occur. Typically, a superframe consists of a downstream burst of several frames and an upstream burst of several frames. Quiet frames are inserted between the upstream and the downstream bursts to allow the channel to settle before the direction of transmission is changed.

Figure 4:
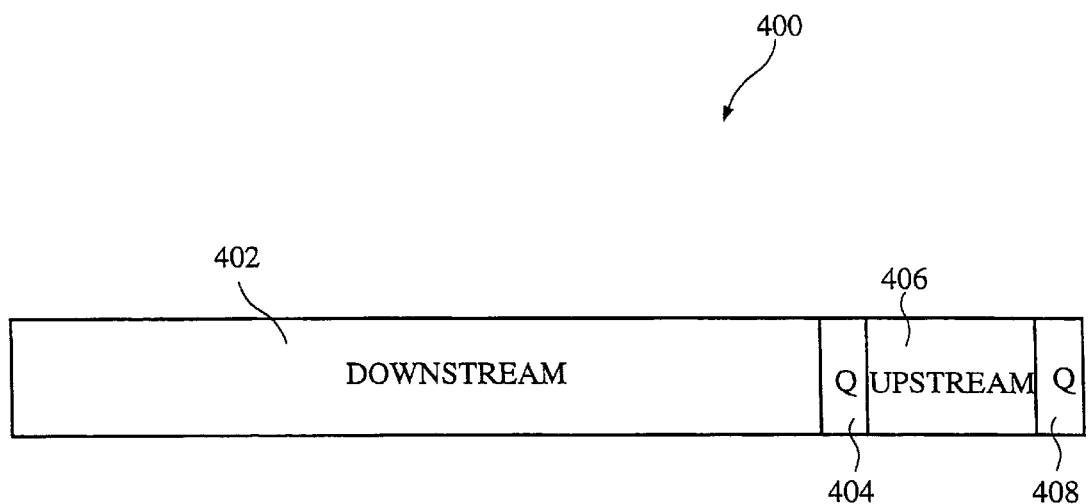
FIG. 4 is a diagram illustrating an exemplary superframe format in which a certain level of service is provided.

FIG. 4 is a diagram illustrating an exemplary superframe format 400 in which a certain level of service is provided. The superframe format 400 is an asymmetric frame that includes a downstream portion 402, a quiet portion 404, an upstream portion 406, and a quiet portion 408. The quiet portions (quiet periods) 404 and 408 are positioned between the downstream and upstream transmissions. With this asymmetric superframe format 400, the downstream portion 402 is substantially larger (e.g., longer burst) than the upstream portion 406. Such a superframe format is useful for situations in which downstream traffic is significantly greater than the upstream traffic. As an example, with respect to FIG. 2, the superframe format 400 can include 16 symbols downstream; 1 quiet period; 2 symbols upstream; and 1 quiet period.

With proper synchronization at a central unit (processing and distribution unit 204 or processing unit 302) and uniform superframe formats, synchronized transmissions of equal duration are provided for all lines within a binder. Accordingly, the NEXT interference problem is effectively eliminated. The synchronization of the central unit and the remote units is also important for accurate data recovery. These synchronizations are needed in synchronized VDSL and SDMT systems. According to the invention, improved synchronization techniques are described below with respect to FIGS. 5–12.

Figure 5A:
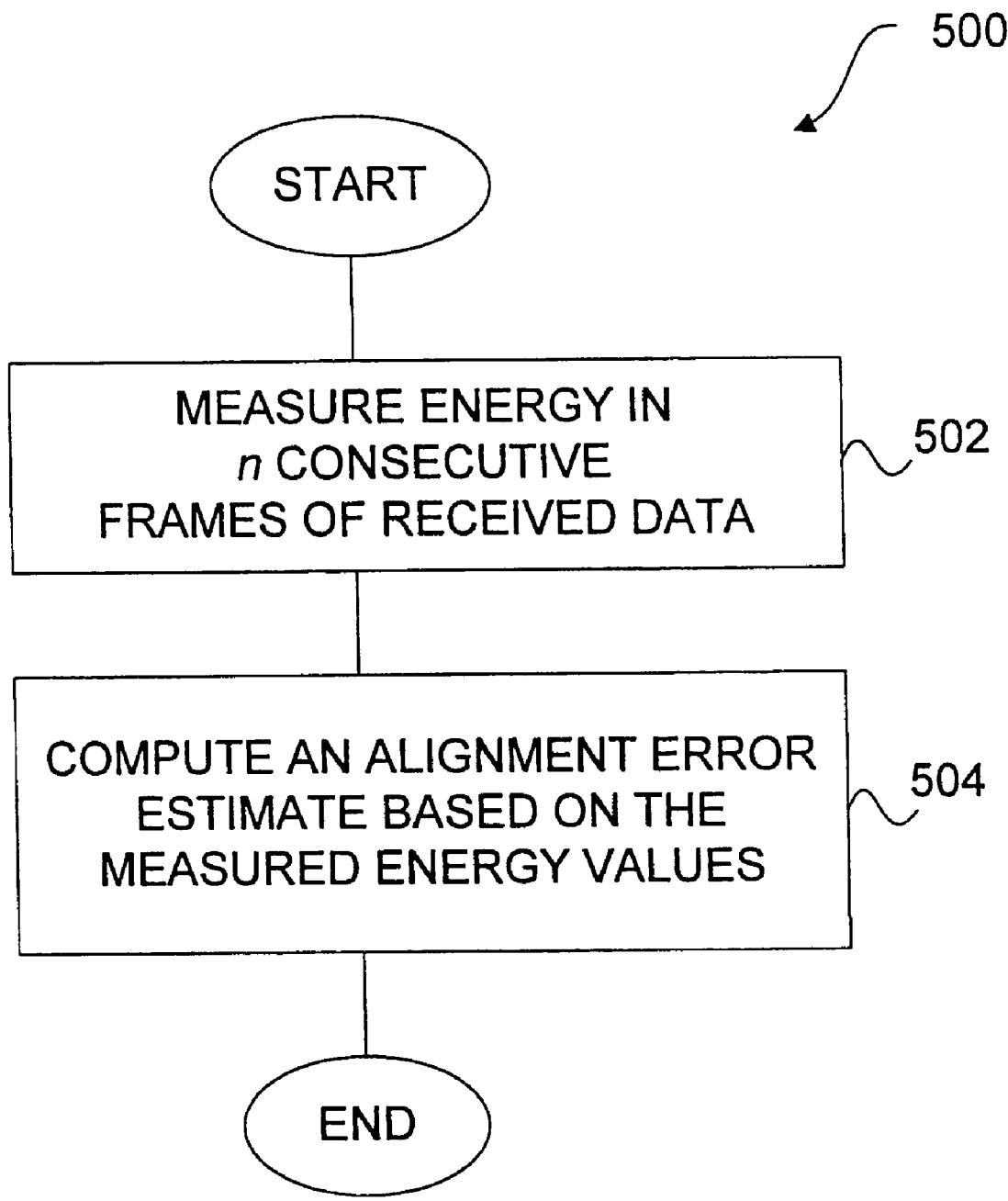
FIG. 5A is a flow diagram of synchronization processing according to a basic embodiment of the invention.

FIG. 5A is a flow diagram of synchronization processing 500 according to a basic embodiment of the invention. Initially, the synchronization processing 500 measures 502 energy in n consecutive frames of received data. An alignment error estimate is then computed 504 based on the measured energy values for the n consecutive frames. Following block 504, the synchronization processing 500 is complete and ends.

Figure 5B:
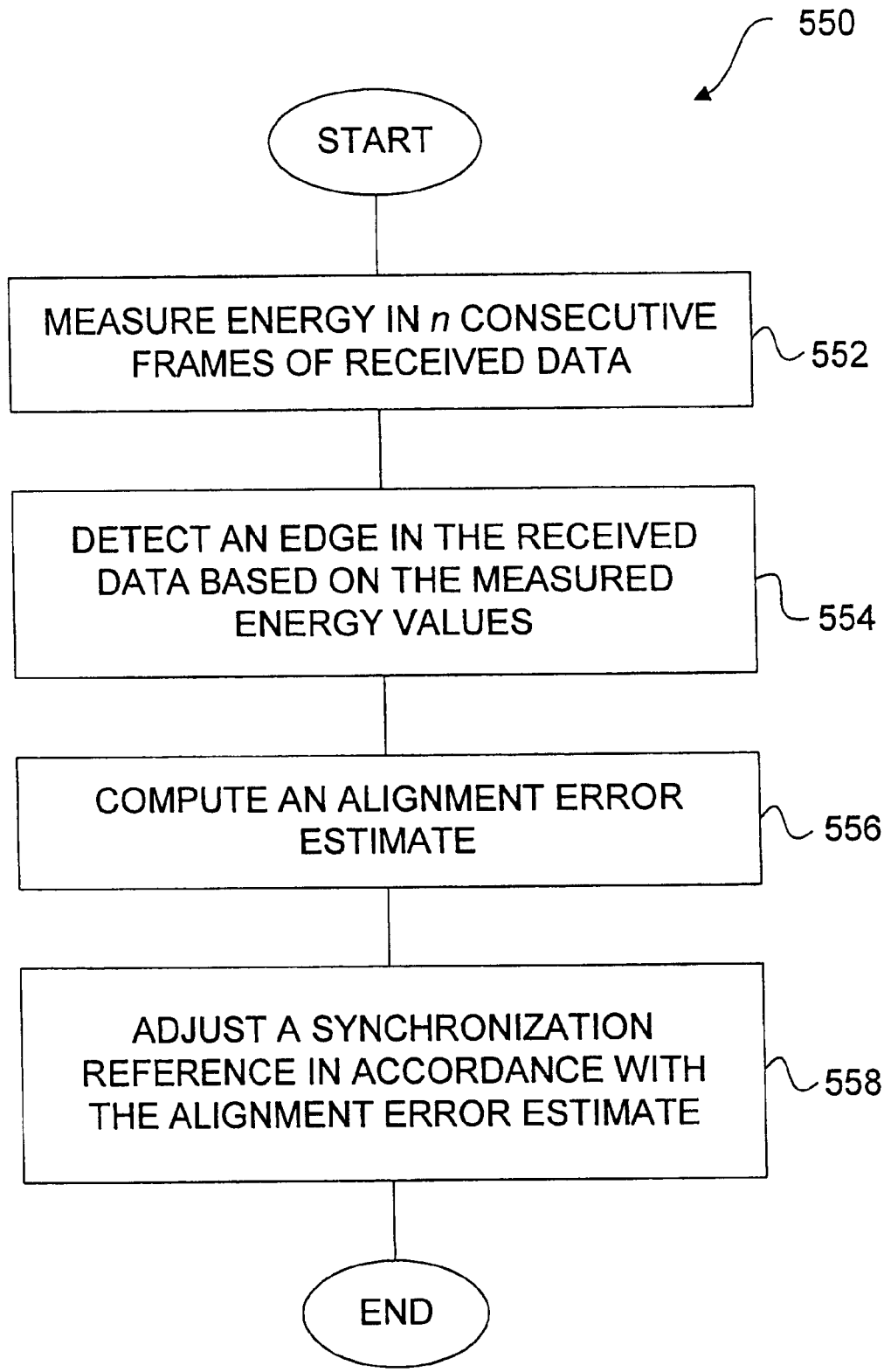
FIG. 5B is a flow diagram of synchronization processing according to an embodiment of the invention.

FIG. 5B is a flow diagram of synchronization processing 550 according to an embodiment of the invention. Initially, the synchronization processing 550 measures 552 energy in n consecutive frames of received data. Next, an edge is detected 554 in the received data based on the measured energy values for the n consecutive frames. An alignment error estimate is then computed 556 from the position of the edge that has been detected. Thereafter, the synchronization processing 550 is able to adjust 558 its synchronization reference in accordance with the alignment error estimate. Following block 558, the synchronization processing 550 is complete and ends.

By determining and adjusting synchronization of receivers of the remote units to transmissions from a central unit in accordance with the synchronization processing 500 or 550, the remote units are able to establish synchronization with the central unit. Once synchronized the central unit and the remote units are able to share a channel (transmission line) in a time-division duplexed manner. Also, the synchronization processing 500 or 550 is suitable for determining and adjusting synchronization of receivers at the central unit with transmissions from the remote units.

Figure 1A:
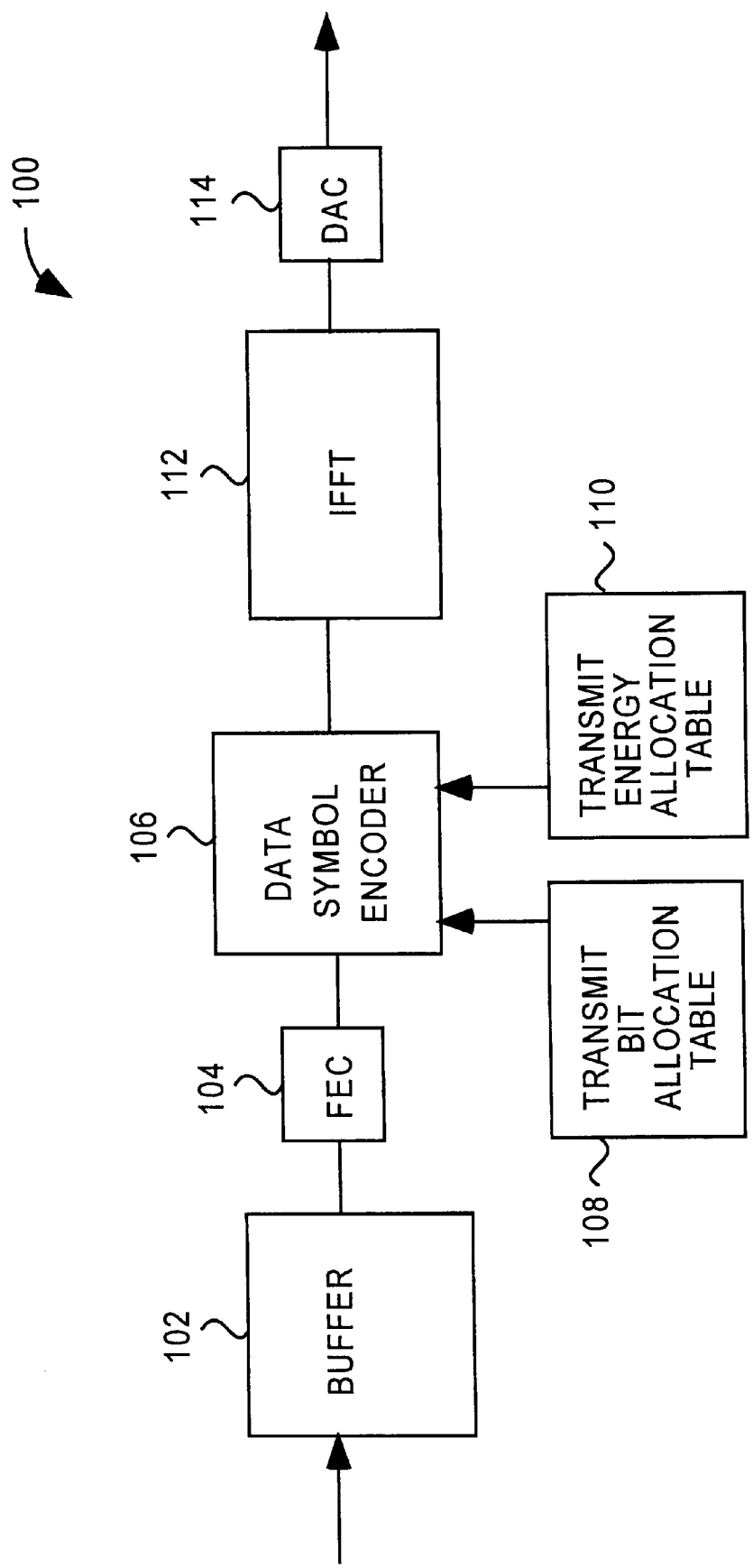
FIG. 1A is a simplified block diagram of a conventional transmitter for a multicarrier modulation system.
Figure 1B:
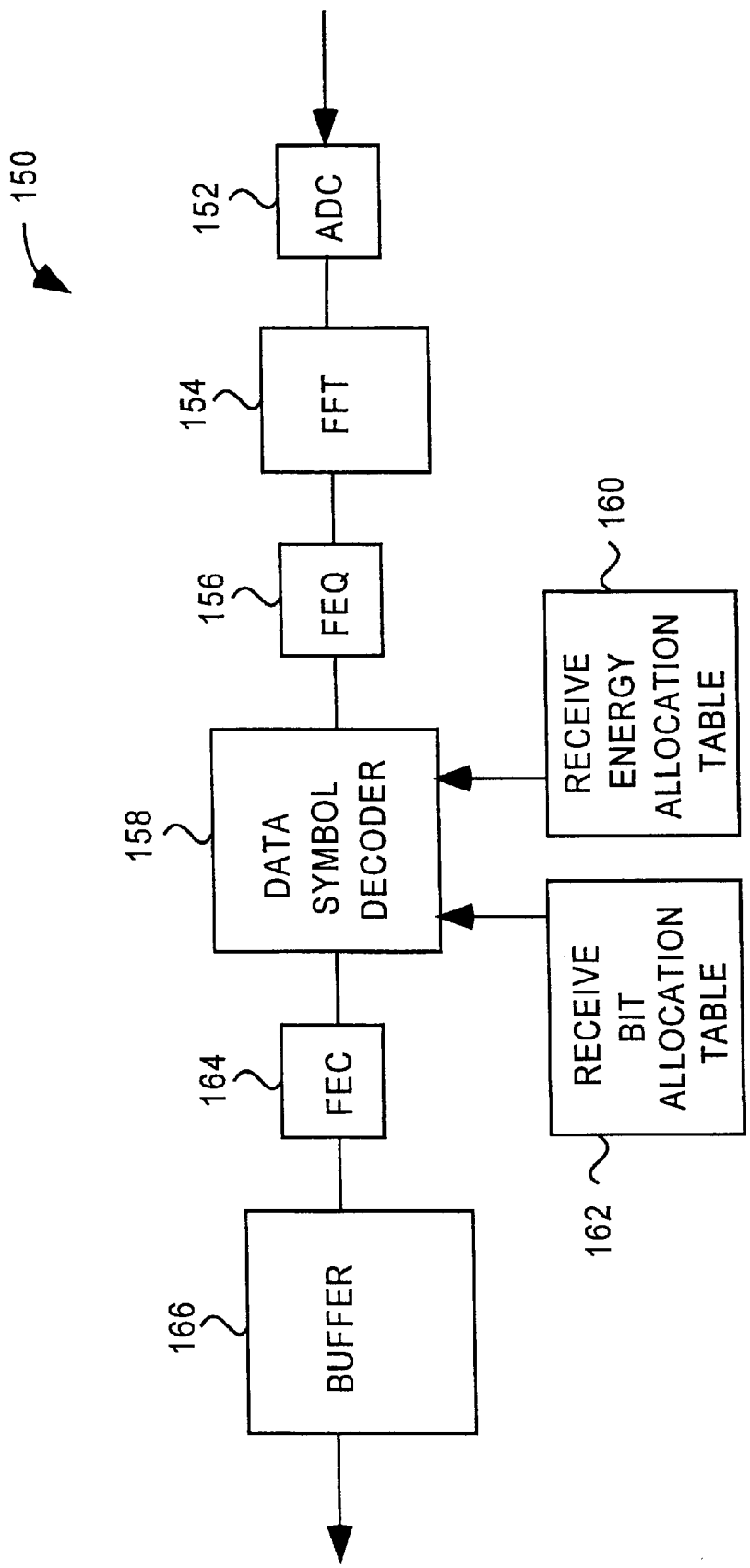
FIG. 1B is a simplified block diagram of a conventional remote receiver for a conventional multicarrier modulation system.
Figure 6A:
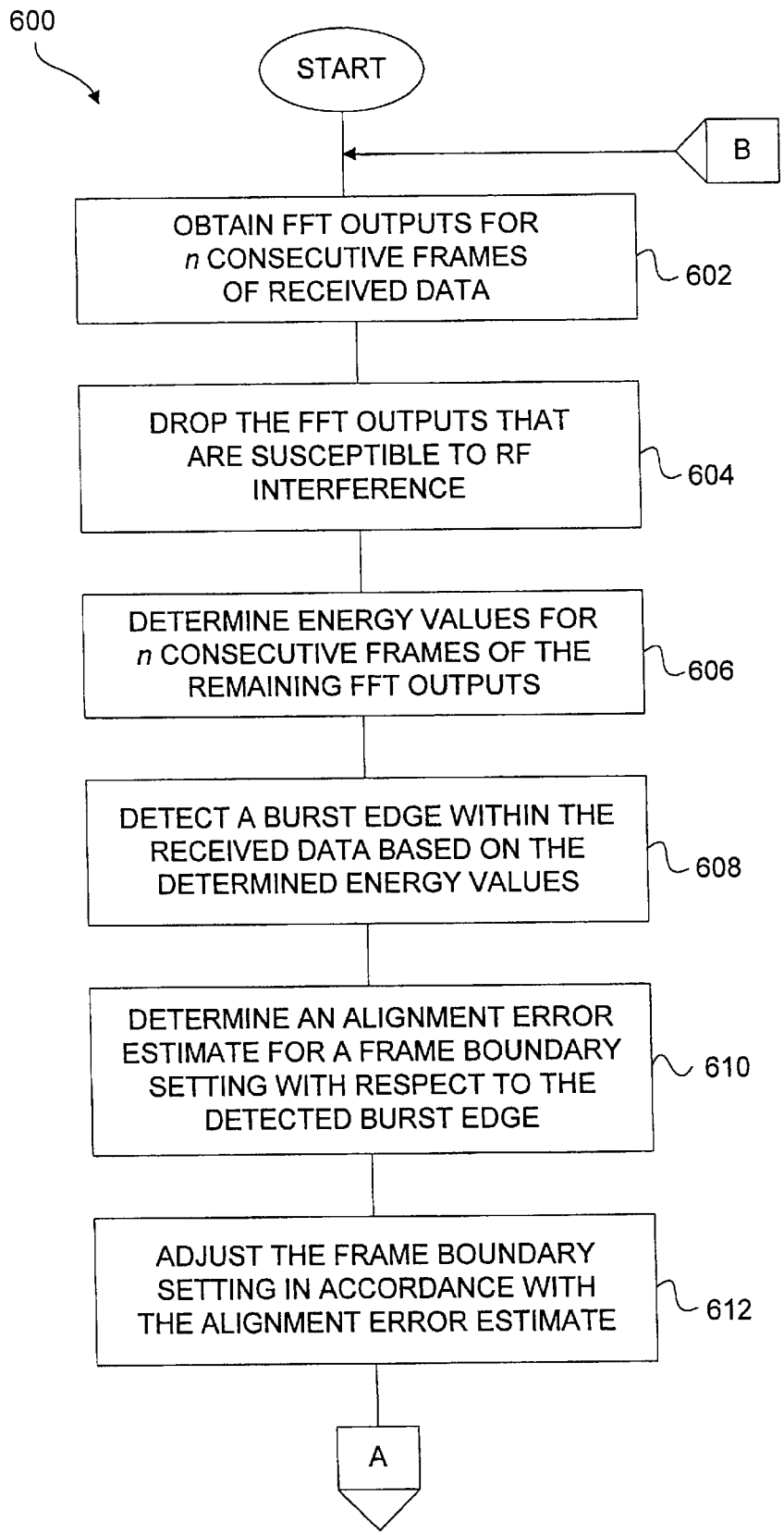
FIGS. 6A and 6B are flow diagrams of synchronization processing according to a more detailed embodiment of the invention.
Figure 6B:
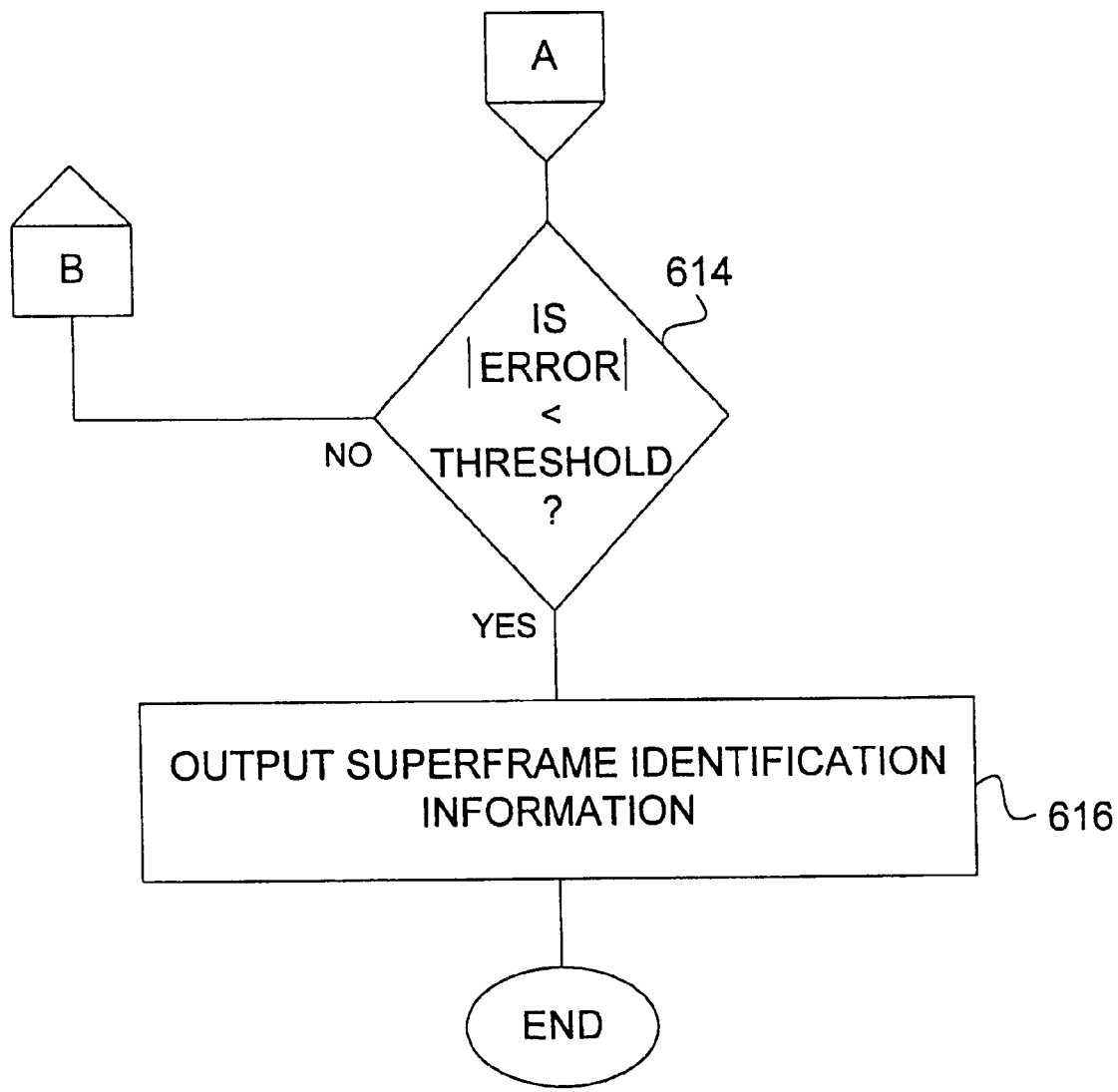

FIGS. 6A and 6B are flow diagrams of synchronization processing 600 according to a more detailed embodiment of the invention. Once the synchronization processing 600 is initiated, FFT outputs are obtained 602 for n consecutive frames of received data. Typically, a receiver side of a transceiver will receive data from a transmission line and forward the received data to an analog-to-digital converter and then to a FFT unit, such as illustrated in FIG. 1B. Hence, the FFT outputs may be obtained from the output of the FFT unit. The FFT outputs are frequency domain signals.

Next, the FFT outputs that are susceptible to RF interference are dropped 604. The remaining FFT outputs are then used for subsequent processing. Typically, a frame includes a plurality of different frequency tones. Each of the frequency tones is capable of having data encoded thereon for transmission. However, certain of the frequency tones are more susceptible to RF interference than others. In the case where the RF interference is caused by amateur radio users, it is usually known which frequency tones of the frame are likely subjected to the RF interference due to amateur radio users. In the case of a remote unit of a synchronized multicarrier VDSL system, where a frame has 256 frequency tones, frequency tones 6 through 40 are generally free from RF interference due to amateur radio users, less attenuated because lower frequency tones have less attenuation, and therefore sufficient to obtain a reliable synchronization result. Hence, in one embodiment, frequency tones 6 through 40 from each of n consecutive frames are used for subsequent processing.

Next, energy values for the n consecutive frames of the remaining FFT outputs are determined 606. As an example, if the frequency tones 6 through 40 are being utilized, then the corresponding outputs from the FFT unit are obtained and then converted to energy values and summed together so as to produce a single energy value for the frame. Preferably, the energy values are power values for the frames. As an example, the single energy value for a frame can be obtained by summing the squared moduli of all outputs of the FFT unit that are in use. Alternatively, the energy values could be obtained by summing the energies of time domain samples, after having filtered out those time domain samples that are subjected to substantial amounts of RF interference.

Once the energy values for the n consecutive frames have been determined 606, the synchronization processing 600 detects 608 a burst edge within the received data based on the determined energy values. By detecting the burst edge, a receiver is able to identify when the received data burst from a transmitter begins. The burst edge thus identifies the beginning (or end) of a received transmission from the transmitter and additionally identifies a synchronization for the frame. A trailing edge within the received data and/or characteristics of the superframe (superframe information) can also be detected.

Next, an alignment error estimate for a frame boundary setting is determined 610 with respect to the detected burst edge. Here, using the burst edge that has been detected 608, the alignment error estimate can be determined 610 for a frame boundary setting. In particular, from the determined energy values in the burst edge, the remote unit synchronization processing 600 is able to determine the alignment error for a frame (i.e., error in frame synchronization). Typically, the alignment error is estimated as a fraction of a frame. Thereafter, the frame boundary can be adjusted 612 in accordance with the alignment error estimate.

Once adjusted 612, the frame synchronization should be established. However, preferably, the synchronization processing 600 continues to confirm that the synchronization has been achieved. Specifically, following block 612, a decision block 614 determines whether the absolute value of the alignment error estimate is less than a predetermined threshold. If the alignment error estimate is not less than a predetermined threshold, then the synchronization processing 600 returns to repeat block 602 and subsequent blocks so as to iteratively reduce the magnitude of the error. On the other hand, when the decision block 614 determines that the alignment error estimate is less than the predetermined threshold, then the superframe information is output 616. As an example, the superframe information can indicate the beginning of the received transmission and the end of the received transmission and/or the number of frames in the burst. Following block 616, the synchronization processing 600 is complete and ends.

Normally, when the frame synchronization is adjusted 612 by a significant amount, the alignment error estimate is greater than the predetermined threshold. Hence, the synchronization processing 600 will repeat and should produce a small alignment error amount which is less than the predetermined threshold. Then, the synchronization processing 600 is able to proceed to block 616. Alternatively, the decision block 614 can be eliminated when the alignment error estimate is produced accurately with a high degree of confidence.

Figure 7:
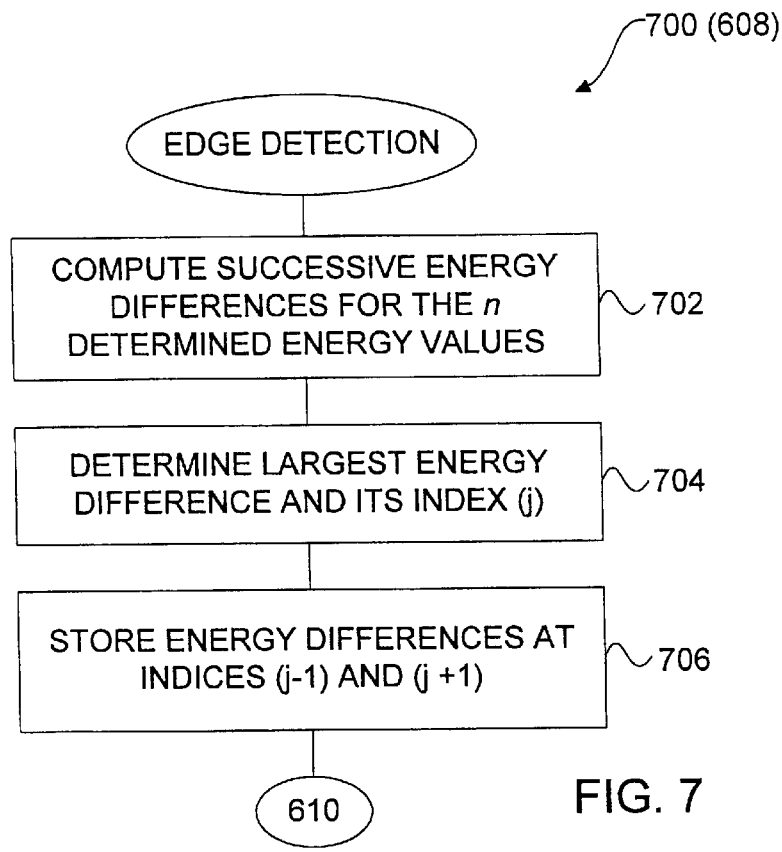
FIG. 7 is a flow diagram of edge detection processing according to an embodiment of the invention.

FIG. 7 is a flow diagram of edge detection processing 700 according to an embodiment of the invention. The edge detection processing 700 describes additional details on the block 608 in FIG. 6A where the burst edge is detected. The edge detection processing 700 initially computes 702 successive energy differences for the n determined energy values. These successive energy differences may be indexed from 1 to i. Next, the largest energy difference and its index (j) are determined 704. The energy differences at indices (j−1) and (j+1) are then stored 706 for later retrieval. Following block 706, the edge detection processing 700 is complete and the processing returns to block 610 of the synchronization processing 600.

Figure 8:
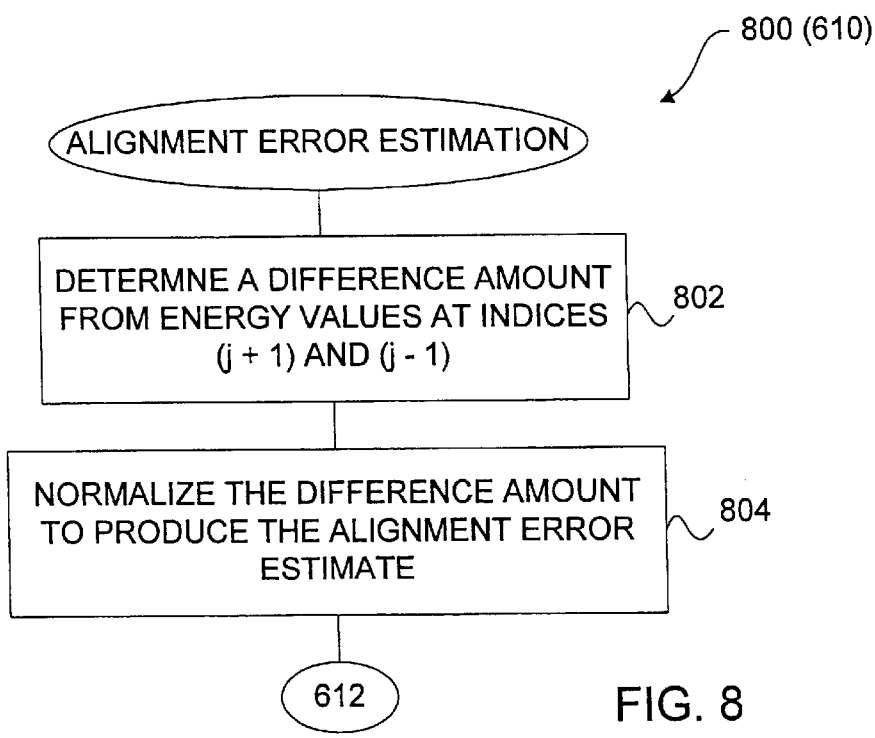
FIG. 8 is a flow diagram of alignment error estimation processing according to an embodiment of the invention.

FIG. 8 is a flow diagram of alignment error estimation processing 800 according to an embodiment of the invention. The alignment error estimation processing 800 describes additional details on the block 610 in FIG. 6A where an alignment error estimate is determined. The alignment error estimation processing 800 initially determines 802 a difference amount from the energy values at indices (j+1) and (j−1). The energy values at indices (j+1) and (j−1) are the energy values immediately proceeding and immediately following the largest energy difference at index (j). The energy values can, for example, be power values. Next, the difference amount is normalized 804 to produce the alignment error estimate. In this embodiment, the alignment error estimate represents a fractional part of a frame. Accordingly, the synchronization of the receiver to the data transmission unit would be off by this fractional part of the frame. Following block 804, the alignment error estimation processing 800 is complete and the processing returns to block 612 of the synchronization processing 600.

Figure 9A:
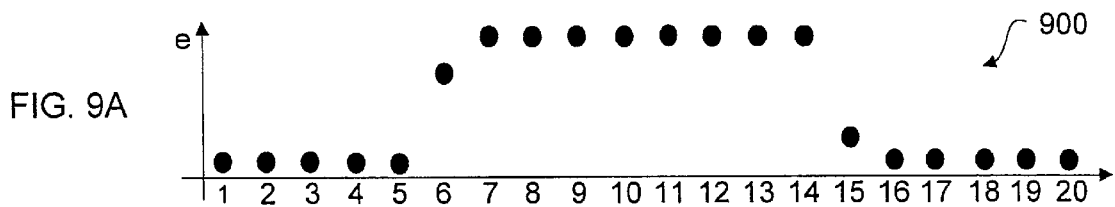
FIGS. 9A and 9B represent diagrams of energy values and energy difference values for received data over a sequence of twenty frames.
Figure 9B:
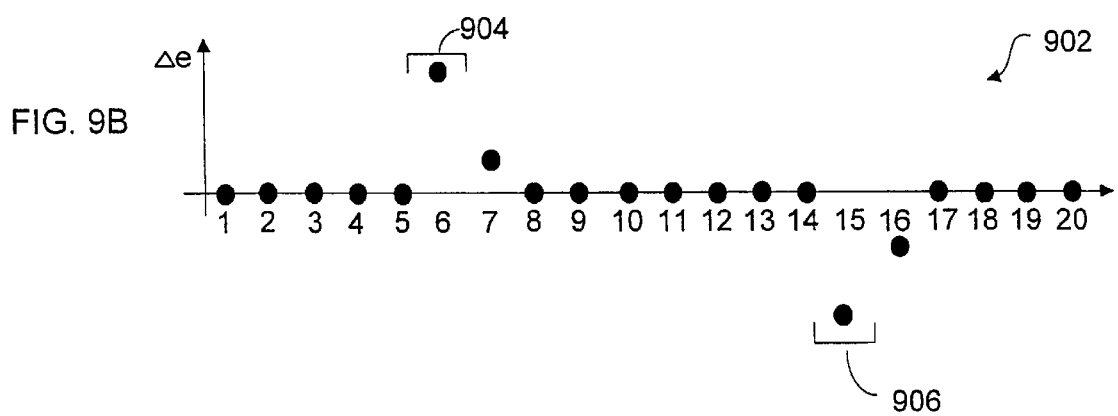

FIGS. 9A and 9B represent diagrams of energy values (e) and energy difference values (Δe) for received data over a sequence of twenty frames. In FIG. 9A, a diagram 900 plots the energy values (e) for the twenty frames shows a burst of data in the vicinity of frames 6 through 15. As an example, the energy values (e) are produced by block 606 in FIG. 6A. In FIG. 9B, a diagram 902 plots successive energy difference values (Δe) for the determined energy values. The successive energy difference values (Δe) identify regions associated with edges or transition points in the received data. A first edge represents an initial edge or the start of a burst of data and is somewhere within a region 904, and a second edge 906 represents a trailing edge, or an end of a burst of data, and is somewhere within a region 906. As an example, the energy difference values (Δe) are determined by block 702 in FIG. 7.

As seen in FIGS. 9A and 9B, the receiver is not properly synchronized with the incoming transmitted data from a remotely located transmitter. In particular, the beginning of the burst of data received from the transmitter begins somewhere within frame 6. To be properly synchronized, the burst of data from the transmitter would begin exactly at the beginning of frame 6 in this example. By using the energy difference values (Δe), the technique achieves substantial immunity to noise levels on the received data. The diagram 902 shows that the initial edge of the burst of data is within the region 904, i.e., somewhere within frame 6, and that the trailing edge of the burst of data is within the region 906, i.e., somewhere within frame 14.

Figure 10A:
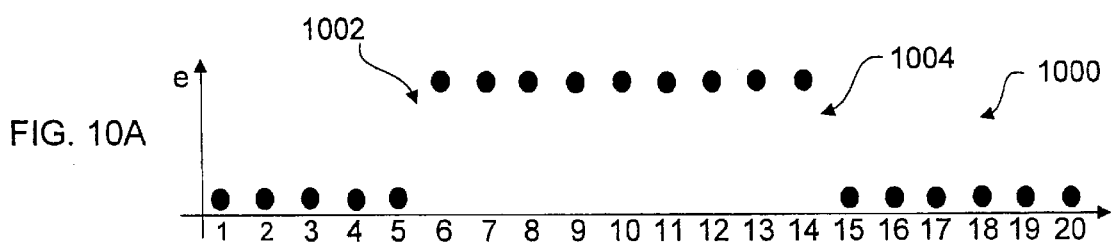
FIGS. 10A and 10B represent energy values and energy difference values for received data over a series of twenty frames for the example illustrated in FIGS. 9A and 9B after an alignment adjustment has been made in accordance with the invention.
Figure 10B:
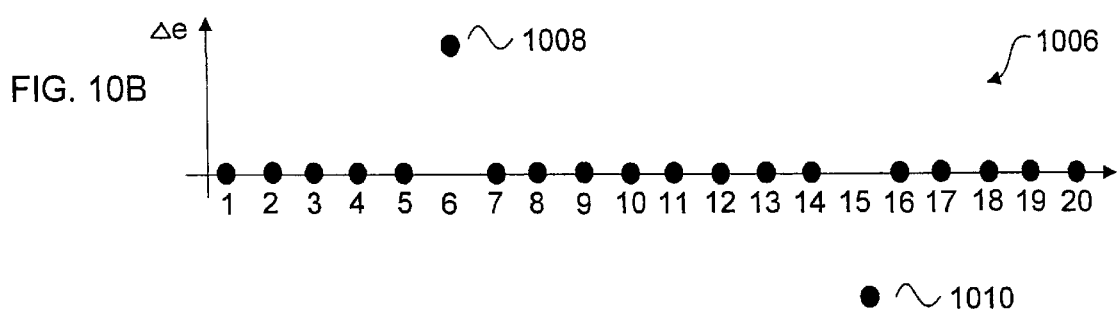

FIGS. 10A and 10B represent energy values (e) and energy difference values (Δe) for received data over a series of twenty frames for the example illustrated in FIGS. 9A and 9B after an alignment adjustment has been made in accordance with the invention, that is, with proper synchronization. In FIG. 10A a diagram 1000 indicates a burst of data between frames 6 and 14 with an initial edge 1002 at the beginning of frame 6 and a trailing edge 1004 at the end of frame 14. In FIG. 10B, a diagram 1006 illustrates the successive energy difference values (Δe) over the twenty frames, including an initial maximum point 1008 and a trailing maximum point 1010. The initial edge (frame 6) of the burst of data indicates the starting frame of the received burst of data, while the negative edge (frame 15) indicates the frame following the end of the burst of data. From this information, the received burst length can be inferred (9 frames), and the superframe format can be identified (9-1-9-1).

During synchronization the successive differences in the energy values observed in each frame of the superframe will show a positive and negative peak. The positive peak indicates the leading edge of a burst, while the negative edge indicates the end of a burst. According to one embodiment of the invention, the edge detection processing adjusts the frame alignment so that the maximum difference is increased, the right-hand neighboring energy difference is forced to zero. When synchronization has been obtained, the result is as shown in FIG. 10B. Note that the edge detection processing is relatively insensitive to the absolute amplitudes being observed. The successive differences approach requires only that the energy in the "quiet" frames (which are not truly quiet due to noise) be smaller than the energy in the active frames and that the energy be approximately constant for each type of frame.

When the data transmission system operates to delete a cyclic prefix at the receiver, a dead-zone may be created in the frame/superframe alignment that is the width of the cyclic prefix because the removal of the cyclic prefix drops samples useful for frame synchronization but thus unavailable from the FFT unit. One technique to resolve this dead-zone where the frame has 512 samples and the cyclic prefix has 40 samples is to use energy estimates from samples 41 through 552 as well as using samples 1 to 512, and then take the mean of these energy estimates to get a combined energy estimate which is then used in the burst detection processing.

The synchronization processing discussed above is generally applicable to remote side and central side synchronization. For synchronization processing at a remote unit, a receiver at the remote unit acquires and maintains synchronization with data transmissions (bursts) with a transmitter of the central unit. As for synchronization processing at a central unit, a receiver at the central unit acquires and maintains synchronization with data transmissions (bursts) with a transmitter of a remote unit. In one embodiment, the synchronization is managed by setting or adjusting receive frame alignment for the recovery of data transmissions (bursts) at a receiver.

Due to the round-trip delay of a line (or channel), the time at which an upstream transmission from a remote unit reaches a central unit will vary and will appear to be late by the by the length of the round-trip delay if no correction is made. Accordingly, the central unit needs to adjust its receive frame alignment so that the correct receive samples are used in the receiver at the central unit. The processing carried out at the central unit to adjust its receive frame alignment is similar to the synchronization processing discussed above for the remote unit. Generally, the energy in upstream frames being received is measured over a number of frames corresponding to the length of the upstream transmission burst from the remote unit. These energy values are used to identify the start of the upstream transmission burst and then determines an alignment correction to align the receive frame boundary pointer with the frames of data received from the remote unit.

Figure 11:
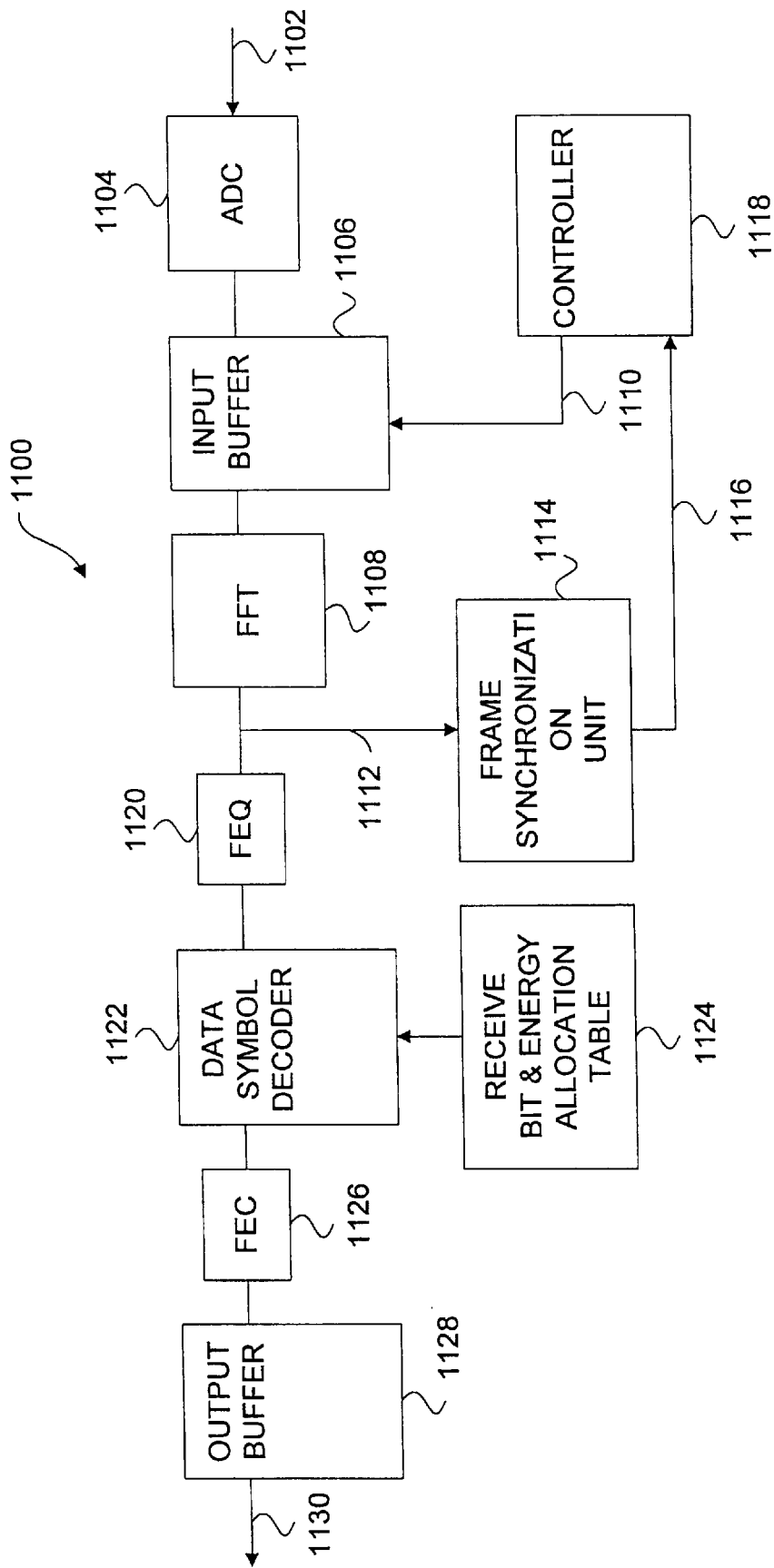
FIG. 11 is a block diagram of a receiver according to one embodiment of the invention.

FIG. 11 is a block diagram of a receiver 1100 according to one embodiment of the invention. The receiver 1100 is part of a time domain duplexed transmission system. The construction of the receiver 1100 illustrated in FIG. 11 may be used in either or both of the central office transceiver and the remote unit transceiver.

The receiver 1100 receives analog signals 1102 that have been transmitted over a channel from a transmitter (e.g., a central office transmitter). The received analog signals are then supplied to an analog-to-digital (ADC) 1104 which converts the received analog signals to digital signals. The digital signals are then supplied to an input buffer 1106 that temporarily stores the digital signals. The FFT unit 1108 retrieves a frame of data from the input buffer 1106 in accordance with a receive frame boundary pointer 1110, and then produces frequency domain signals.

In accordance with the invention, the FFT unit 1108 outputs the frequency domain signals 1112 to a frame synchronization unit 1114. The frame synchronization unit 1114 operates to perform the synchronization processing discussed above with reference to FIGS. 5–10B. The frame synchronization unit 1114 outputs an alignment error estimate 1116 to a controller 1118. The controller 1118 then adjusts the receive frame boundary pointer 1110 for accessing the received data from the input buffer 1106. Hence, the frame synchronization unit 1114 provides for frame synchronization in the time domain duplexed transmission system in a manner that is substantially immune from RF interference (e.g., such as from amateur radio users). The controller 1118 also controls the overall operation of the receiver 1100. The controller 1118, for example, controls the receiver 1100 to perform the initialization processing and to monitor steady-state data transmission. For example, the controller 1118 can be implemented by a digital signal processor, a microprocessor or microcontroller, or specialized circuitry. In the case where the receiver 1100 forms part of a transceiver, the controller 1118 can be used by both transmit and receive sides of the transceiver, shared among a plurality of transceivers, or individually provided for each transmitter and receiver. Likewise, the frame synchronization unit 1114 can be implemented by a digital signal processor, a microprocessor or microcontroller, or specialized circuitry.

Returning to the receive data path the frequency domain signals 1112 output by the FFT unit 1108 are then equalized by the FEQ unit 1120. The equalized signals are then supplied to a data symbol decoder 1122. The data symbol decoder 1122 operates to decode the equalized signals to recover data that has been transmitted on each of the frequency tones of the symbol being received. The decoding by the data symbol decoder 1122 is performed based on bit allocation information stored in a receive bit and energy allocation table 1124. The decoded data is then supplied to the FEC unit 1126 and then stored in an output buffer 1128. Thereafter, recovered data 1130 (stored decoded data) may be retrieved from the output buffer 1128 as needed.

The receiver 1100 illustrated in FIG. 11 optionally includes other components. For example, when a corresponding transmitter adds a cyclic prefix to symbols after an IFFT unit, the receiver 1100 can remove the cyclic prefix before the FFT unit 1108. Also, the receiver 1100 can provide a time domain equalizer (TEQ) unit between the ADC 1104 and the FFT unit 1108. Additional details on TEQ units are contained in U.S. Pat. No. 5,285,474 and U.S. Application Serial No. 60/046,244 (Att.Dkt.No.: AMATP021+), filed May 12, 1997 and entitled POLY-PATH TIME DOMAIN EQUALIZATION, which are hereby incorporated by reference.

Moreover, the invention provides techniques to synchronize transmissions at a central side (i.e., central unit). With synchronized transmissions at the central side, the NEXT interference is substantially eliminated, provided all lines of a binder offer the same level of service (i.e., superframe format). However, if the transmissions from the central side over lines in a binder are not properly synchronized, the NEXT interference is a substantial impediment to efficient and accurate operation of the data transmission system. Hence, the invention also pertains to techniques to adjust a transmit frame boundary at a central side transmitter of data transmission system. The general principle is to use NEXT interference from other central side transmissions. If the NEXT interference is not strong enough to be detected for synchronization purposes, then it will be assumed to be insignificant during reception, and therefore synchronization is not necessary.

Conventionally, the various transmitters at the central side can synchronize with one another by all using a common master clock supplied to the central side. However, sometimes such a master clock is not available for one reason or another. Also, even though available, the various transmitters could be positioned at slightly greater positions from the master clock source so as to cause small synchronization differences between the various transmissions. Hence, the synchronization techniques according to the invention can also be used to synchronize various transmissions at the central side.

Figure 12:
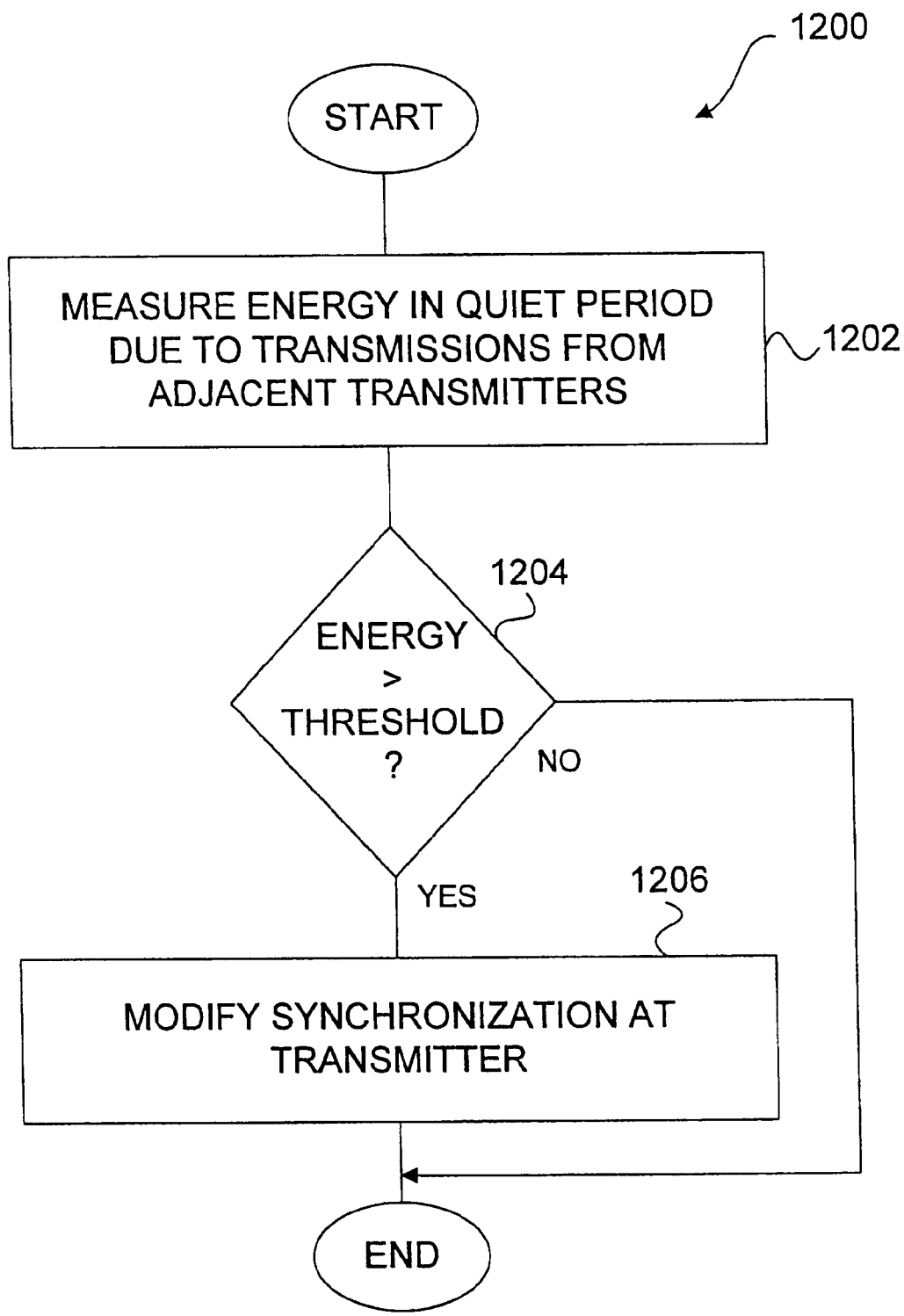
FIG. 12 is a flow diagram of a synchronization processing for synchronizing adjacent transmitters to compensate for small synchronization differences.

FIG. 12 is a flow diagram of a synchronization processing 1200 for synchronizing adjacent transmitters to compensate for small synchronization differences. If these small synchronization differences were to go uncorrected, over time the degree of the lack of synchronization worsens. The synchronization processing 1200 initially measures 1202 energy received from other transmitters at the central side. Here, during quiet periods (or guard periods), energy being received from other transmitters at the central side is measured by the receivers associated with the transmitters (i.e., transceivers). The transmissions from the various transmitters all follow the same superframe format. Preferably, the second quiet period (i.e., after the upstream transmission) is used to measure the energy because there tends to be less echo present. Next, a decision block 1204 determines whether the measured energy is greater than a predetermined threshold amount. If the measured energy during the quiet period is determined to be greater than the predetermined threshold amount, then the presence of NEXT interference is detected. Since NEXT interference is detected, it is known that the transmitters at the central side are not synchronized. Hence, the timing alignment at the transmitter is modified 1202 in order to synchronize its alignment with respect to the other transmitters at the central side. For example, the timing alignment could be modified by altering an oscillator frequency or changing (increase or decrease) the length of the superframe. On the other hand, when the measured energy is determined to be less than the predetermined threshold amount, then the transmitters at the central side are deemed to be sufficiently aligned and thus block 1206 is bypassed. Following block 1206 or following block 1204 when the predetermined threshold is not exceeded, the synchronization processing 1200 is complete and ends.

The synchronization processing 1200 is performed by all the transceivers at the central side. By repeating the synchronization processing 1200, gradually the alignment will reach a more less steady state, particularly if adjustments to alignment are made in only one direction.

Recall, as illustrated in FIG. 4, the superframe format has two quiet periods 404 and 408. The synchronization processing 1200 uses one of the two quiet periods 404 and 408. When a receiver at the central side hears the NEXT interference during the quiet period 408, it means that this transceiver is late and should transmit earlier. Alternatively, if the receiver at the central side uses the quiet period 404 and hears the NEXT interference during the quiet period 404, it means that this transceiver is early and should transmit later. However, before the transceiver adjust its timing alignment at the central side, it may inform the corresponding remote unit of the change so that it also modifies its timing alignment. This notification to the remote can, for example, be performed over an overhead channel.

The synchronization technique needs to distinguish downstream NEXT interference from upstream FEXT interference. This can be achieved a number of different ways. One way to distinguish upstream transmissions from downstream transmissions, in the case of VDSL using DMT frames with 256 tones, is to use tone 128 which is Nyquist/2 only with downstream transmissions. As noted above, the quiet period is used to measure the interference from adjacent downstream transmissions. If the downstream distinguishing feature is detected (greater than some threshold) it means that the clock in this unit is running faster than the interfering transmitter's clock.

The adjustment to the synchronization can be to modify the clock frequency of the particular transceiver's clock, such as with a voltage controlled oscillator. Alternatively, an extra cycle can be inserted into the superframe structure. In VDSL, if the central side transceiver's clocks are within 100 ppm of each other, then insertion of 1 sample per superframe (11,040 samples) will be sufficient to monitor synchronization. If the central side transceivers can only insert, the central side transceivers will reach a consensus at the lowest clock frequency of the group (that has significant NEXT).

For example, the energy of tone 128 can be measured with a special single-tone DFT:

$$|z_{128}|^2 = \left[\sum_{k=0}^{255} x_{2k}(-1)^k\right]^2 + \left[\sum_{k=0}^{255} x_{2k+1}(-1)^{k+1}\right]^2$$

If the measured energy is larger than a predetermined threshold, then insert a sample (extra cycle) in the subsequent downstream transmission.

The advantages of the invention are numerous. One advantage of the invention is that synchronization can be achieved even in the presence of radio frequency (RF) interference, such as due to amateur radio signals. Another advantage of the invention is that it is well suited for data transmission systems utilizing time division duplexing such as synchronized DMT or synchronized VDSL. Yet another advantage of the invention is that it is relatively insensitive to background or receiver noise.

The many features and advantages of the present invention are apparent from the written description, and thus, it is intended by the appended claims to cover all such features and advantages of the invention. Further, since numerous modifications and changes will readily occur to those skilled in the art, it is not desired to limit the invention to the exact construction and operation as illustrated and described. Hence, all suitable modifications and equivalents may be resorted to as falling within the scope of the invention.

What is claimed is:

1. A method for adjusting an alignment for a first transceiver to receive frames of data transmitted from a second transceiver over a transmission medium to the first transceiver, the first transceiver and the second transceiver being associated with a data transmission system providing two-way data communication using time division duplexing, said method comprising the acts of:

measuring an energy amount for each of a plurality of consecutive frames of received data;

detecting an edge in the plurality of consecutive frames of the received data based on the measured energy amounts, the edge detected being a burst edge, said detecting including at least the acts of:

computing successive energy differences in the plurality of the measured energy amounts; and identifying a largest one of the successive energy differences, the largest one of the successive energy difference corresponding to the burst edge; and determining an alignment error estimate using the edge detected in the plurality of consecutive frames.

2. A method as recited in claim 1, wherein the data transmission system transmits data using a superframe structure having a plurality of frames, a first set of the frames in the superframe transmit data in a first direction, and a second set of the frames in the superframe transmit data in a second direction.

3. A method as recited in claim 2, wherein the first transceiver uses a frame boundary pointer to identify a beginning of a frame in the superframe being received, and wherein said method further comprises:

adjusting the frame boundary pointer in accordance with the alignment error estimate.

4. A method as recited in claim 3, wherein the alignment error estimate is an estimated alignment error as a fraction of a frame.

5. A method as recited in claim 3, wherein said method further comprises:

comparing the alignment error estimate with a threshold amount;

repeating said measuring through said determining until said comparing indicates that the alignment error estimate is less than the threshold amount.

6. A method as recited in claim 5, wherein said method further comprises:

outputting superframe identification information.

7. A method as recited in claim 1, wherein said determining comprises:

identifying a prior energy difference and a subsequent energy difference, the prior energy difference being the one of the successive differences immediately preceding the largest one of the successive energy differences, and the subsequent energy difference being the one of the successive differences immediately following the largest one of the successive energy differences; and determining the alignment error estimate based on the prior energy difference and the subsequent energy difference.

8. A method as recited in claim 7, wherein said determining of the alignment error estimate computes a difference amount between the subsequent energy difference and the prior energy difference.

9. A method as recited in claim 7, wherein said determining of the alignment error estimate computes a difference amount between the subsequent energy difference and the prior energy difference, and then normalizes the difference amount to produce the alignment error estimate.

10. A method for adjusting an alignment for a first transceiver to receive frames of data transmitted from a second transceiver over a transmission medium to the first transceiver, the first transceiver and the second transceiver being associated with a data transmission system providing two-way data communication using time division duplexing, the first transceiver uses a frame boundary pointer to identify a beginning of a frame in the superframe being received, said method comprising the acts of:

measuring an energy amount for each of a plurality of consecutive frames of received data;

detecting an edge in the plurality of consecutive frames of the received data based on the measured energy amounts;

determining an alignment error estimate using the edge detected in the plurality of consecutive frames; and adjusting the frame boundary pointer in accordance with the alignment error estimate.

11. A method as recited in claim 10, wherein the alignment error estimate is an estimated alignment error as a fraction of a frame.

12. A method as recited in claim 10, wherein said method further comprises:

comparing the alignment error estimate with a threshold amount;

repeating said measuring, detecting, determining, and until said comparing indicates that the alignment error estimate is less than the threshold amount.

13. A method as recited in claim 12, wherein said method further comprises:

outputting superframe identification information.

14. A method for adjusting an alignment for a first transceiver to receive frames of data transmitted from a second transceiver over a transmission medium to the first transceiver, the first transceiver and the second transceiver being associated with a data transmission system providing two-way data communication using time division duplexing, the data transmission system transmits data using a superframe structure having a plurality of frames, a first set of the frames in the superframe transmit data in a first direction, a second set of the frames in the superframe transmit data in a second direction, and some of the frames contain a cyclic prefix for the superframe structure, said method comprising the acts of:

(a) measuring an energy amount for each of a plurality of consecutive frames of received data, said measuring (a) of the energy amounts including at least the acts of:

measuring energy amounts of a first set of consecutive frames of received data for the superframe structure;

measuring energy amounts of a second set of consecutive frames of received data for the superframe structure, the second set of the consecutive frames being offset from and overlapped with the first set of the consecutive frames; and combining together the energy amounts from respective consecutive frames from the first and second sets of the consecutive frames to produce the energy amounts; and (b) detecting an edge of the superframe structure within the plurality of consecutive frames of received data using the measured energy amounts.

15. A method as recited in claim 14, wherein the first transceiver is a remote unit and the second transceiver is a central unit.

16. A method as recited in claim 14, wherein the second transceiver is a remote unit and the first transceiver is a central unit.

17. A method as recited in claim 14, wherein the energy amount is a power amount.

18. A method as recited in claim 14, wherein the number of frames in the first and second sets of the consecutive frames is equal to the length of the superframe structure less the length of the cyclic prefix.

19. A method as recited in claim 18, wherein said combining determines mean energy amounts for each of the frames of the superframe structure including the cyclic prefix.

20. A computer readable medium containing program instructions for adjusting an alignment for a first transceiver to receive frames of data transmitted from a second transceiver over a transmission medium to the first transceiver, the first transceiver and the second transceiver being associated with a data transmission system providing two-way data communication using time division duplexing, said computer readable medium comprising:

first computer readable code devices for measuring an energy amount for each of a plurality of consecutive frames of received data; and second computer readable code devices for computing an alignment error estimate using the measured energy amounts, said second computer readable code devices including at least:

computer readable code devices for detecting an edge in the plurality of consecutive frames of the received data based on the measured energy amounts, said computer readable code devices for detecting the edge including at least computer readable code devices for computing successive energy differences in the plurality of the measured energy amounts, and computer readable code devices for identifying a largest one of the successive energy differences, the largest one of the successive energy difference corresponding to a burst edge; and computer readable code devices for determining the alignment error estimate using the edge detected in the plurality of consecutive frames.

21. A computer readable medium as recited in claim 20, wherein said second computer readable medium comprises:

computer readable code devices for identifying a prior energy difference and a subsequent energy difference, the prior energy difference being the one of the successive differences immediately preceding the largest one of the successive energy differences, and the subsequent energy difference being the one of the successive differences immediately following the largest one of the successive energy differences;

computer readable code devices for determining the alignment error estimate based on the prior energy difference and the subsequent energy difference.

22. A computer readable medium containing program instructions for adjusting an alignment for a first transceiver to receive frames of data transmitted from a second transceiver over a transmission medium to the first transceiver, the first transceiver and the second transceiver being associated with a data transmission system providing two-way data communication using time division duplexing, the data transmission system transmits data using a superframe structure having a plurality of frames, some of the frames transmit data in a first direction, some of the frames transmit data in a second direction, and some of the frames contain a cyclic prefix for the superframe structure, said computer readable medium comprising:

first computer readable code devices for measuring an energy amount for each of a plurality of consecutive frames of received data, said second computer readable code devices including at least:

computer readable code for measuring energy amounts of a first set of consecutive frames of received data for the superframe structure;

computer readable code for measuring energy amounts of a second set of consecutive frames of received data for the superframe structure, the second set of the consecutive frames being offset from and overlapped with the first set of the consecutive frames; and computer readable code for combining together the energy amounts from respective consecutive frames from the first and second sets of the consecutive frames to produce the energy amounts for said second computer readable code devices; and second computer readable code devices for computing an alignment error estimate using the measured energy amounts, said second computer readable code devices including at least:

computer readable code devices for detecting an edge in the plurality of consecutive frames of the received data based on the measured energy amounts; and computer readable code devices for determining the alignment error estimate using the edge detected in the plurality of consecutive frames.

23. A computer readable medium as recited in claim 22, wherein said combining determines mean energy amounts for each of the frames of the superframe structure including the cyclic prefix.

24. A computer readable medium as recited in claim 23, wherein the number of frames in the first and second sets of the consecutive frames is equal to the length of the superframe structure less the length of the cyclic prefix.

* * * * *